US012231382B2

(12) United States Patent
He et al.

(10) Patent No.: US 12,231,382 B2
(45) Date of Patent: Feb. 18, 2025

(54) DATA PROCESSING METHOD AND APPARATUS BASED ON INSTANT MESSAGING, DEVICE, AND STORAGE MEDIUM

(71) Applicant: TENCENT TECHNOLOGY (SHENZHEN) COMPANY LTD, Guangdong (CN)

(72) Inventors: Dan He, Guangdong (CN); Fen He, Guangdong (CN); Xuejun Sun, Guangdong (CN); Liqiang Liu, Guangdong (CN); Zhiheng Mo, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 190 days.

(21) Appl. No.: 17/989,268

(22) Filed: Nov. 17, 2022

(65) Prior Publication Data

US 2023/0087220 A1 Mar. 23, 2023

Related U.S. Application Data

(63) Continuation of application No. PCT/CN2021/105115, filed on Jul. 8, 2021.

(30) Foreign Application Priority Data

Aug. 7, 2020 (CN) .......................... 202010787681.6

(51) Int. Cl.
*H04L 51/046* (2022.01)
*H04L 51/06* (2022.01)
*H04L 51/21* (2022.01)

(52) U.S. Cl.
CPC ............ *H04L 51/046* (2013.01); *H04L 51/06* (2013.01); *H04L 51/21* (2022.05)

(58) Field of Classification Search
CPC ........ H04L 51/046; H04L 51/21; H04L 51/06
See application file for complete search history.

(56) References Cited

U.S. PATENT DOCUMENTS 11,122,003 B1 * 9/2021 Garg ..................... H04L 51/046
2006/0036692 A1 2/2006 Morinigo et al.

FOREIGN PATENT DOCUMENTS

| CN | 104022945 A | 9/2014 |
|----|-------------|--------|
| CN | 109274634 A | 1/2019 |

(Continued)

OTHER PUBLICATIONS

International Search Report for PCT/CN2021/105115 dated Sep. 23, 2021.

(Continued)

*Primary Examiner* — Ryan J Jakovac
(74) *Attorney, Agent, or Firm* — Sughrue Mion, PLLC

(57) ABSTRACT

A data processing method and apparatus based on instant messaging, a device, and a computer-readable storage medium. The method includes: obtaining a message transmitting request including message data transmitted by a first communication component, the first communication component being embedded in a first client of a first application platform and obtained by encapsulating an instant messaging function of a second application platform, in response to a trigger operation on a session creation control in a service interface of the first client, the first client invoking the first communication component and displaying a session interface created by the first communication component, obtaining the message data in the session interface, generating the message transmitting request including the message data, and transmitting the message transmitting request to the (Continued)

server by using the first communication component; and transmitting the message data to the receiver user account according to the message transmitting request.

7 Claims, 11 Drawing Sheets

(56) References Cited

FOREIGN PATENT DOCUMENTS

| CN | 109688050 A | 4/2019 |
|----|-------------|--------|
| CN | 110875868 A | 3/2020 |
| EP | 2 839 609 A1 | 2/2015 |

OTHER PUBLICATIONS

Written Opinion for PCT/CN2021/105115 dated Sep. 23, 2021.
Written Opinion issued Sep. 23, 2021 in International Application No. PCT/CN2021/105115.
Extended European Search Report issued Jul. 20, 2023 in Application No. 21854329.6.

* cited by examiner

DATA PROCESSING METHOD AND APPARATUS BASED ON INSTANT MESSAGING, DEVICE, AND STORAGE MEDIUM

CROSS-REFERENCE TO RELATED APPLICATION(S)

This application is a continuation application of International Application No. PCT/CN2021/105115, filed on Jul. 8, 2021, which claims priority to Chinese Patent Application No. 202010787681.6 filed with China National Intellectual Property Administration on Aug. 7, 2020, the disclosures of which are incorporated by reference in their entireties.

FIELD

The present disclosure relates to the field of computer technologies, and in particular, to a data processing method and apparatus based on instant messaging, a device, and a storage medium.

BACKGROUND

Currently, for non-social clients that need to implement an instant messaging capability, during instant messaging, some clients often depend on their own independent development of instant messaging capabilities, resulting in relatively high development costs and waste of development resources and labor. However, some other clients do not have the instant messaging capability. A user using the client needs to transmit message data to another user, the user can only perform data exchange in a non-instant messaging manner such as a comment or a bullet screen, which in turn reduces efficiency of instant messaging among the users.

SUMMARY

According to some embodiments in the disclosure, a data processing method based on instant messaging, performed by a server of a second application platform, may be provided, the method including: obtaining a message transmitting request including message data transmitted by a first communication component, the first communication component being embedded in a first client of a first application platform, the first communication component being obtained by encapsulating an instant messaging function of the second application platform, the second application platform being different from the first application platform, in response to a trigger operation on a session creation control in a service interface of the first client, the first client invoking the first communication component and displaying a session interface created by the first communication component, and obtaining the message data in the session interface, generating the message transmitting request including the message data, and transmitting the message transmitting request to the server by using the first communication component, the session interface being an interface on which a transmitter user account corresponding to the first client performs instant communication with a receiver user account, and the transmitter user account being a user account corresponding to the second application platform and logging in to the first client in a third-party account login manner; and transmitting the message data to the receiver user account according to the message transmitting request.

According to an embodiment of the disclosure, a data processing method based on instant messaging, performed by a first user terminal, a first client of a first application platform running in the first user terminal may be provided, the method including: invoking, in response to a trigger operation on a session creation control in a service interface of the first client, a first communication component corresponding to the session creation control, and displaying a session interface created by the first communication component, the service interface being an interface in the first application platform, the first communication component being obtained by encapsulating an instant messaging function of a second application platform by a server of the second application platform, the second application platform being different from the first application platform, the session interface being an interface on which a transmitter user account corresponding to the first client performs instant communication with a receiver user account, and the transmitter user account being a user account corresponding to the second application platform and logging in to the first client in a third-party account login manner; obtaining to-be-transmitted message data in the session interface, and generating a message transmitting request including the message data; and transmitting the message transmitting request to the server by using the first communication component, the message transmitting request being used for instructing the server to transmit the message data to a second client corresponding to the receiver user account.

According to an embodiment of the disclosure, a data processing apparatus based on an instant messaging application may be provided, the apparatus including: a first request obtaining module, configured to obtain a message transmitting request including message data transmitted by a first communication component, the first communication component being embedded in a first client of a first application platform, the first communication component being obtained by encapsulating an instant messaging function of a second application platform, the second application platform being different from the first application platform, in response to a trigger operation on a session creation control in a service interface of the first client, the first client invoking the first communication component and displaying a session interface created by the first communication component, and obtaining the message data in the session interface, generating the message transmitting request including the message data, and transmitting the message transmitting request to the server by using the first communication component, the session interface being an interface on which a transmitter user account corresponding to the first client performs instant communication with a receiver user account, and the transmitter user account being a user account corresponding to the second application platform and logging in to the first client in a third-party account login manner; and a message transmitting module, configured to transmit the message data to the receiver user account according to the message transmitting request.

According to an embodiment of the disclosure, a data processing apparatus based on an instant messaging application may be provided, the apparatus including: a session interface output module, configured to invoke, in response to a trigger operation on a session creation control in a service interface of a first client, a first communication component corresponding to the session creation control, and output a session interface created by the first communication component, the service interface being an interface in a first application platform, the first communication component being obtained by encapsulating an instant messaging function of a second application platform by a server of the second application platform, the second application platform being different from the first application platform, the session interface being an interface on which a transmitter user account corresponding to the first client performs instant communication with a receiver user account, and the transmitter user account being a user account corresponding to the second application platform and logging in to the first client in a third-party account login manner; a request generation module, configured to obtain to-be-transmitted message data in the session interface, and generate a message transmitting request including the message data; and a request transmitting module, configured to transmit the message transmitting request to the server by using the first communication component, the message transmitting request being used for instructing the server to transmit the message data to a second client corresponding to the receiver user account.

According to an embodiment of the disclosure, a computer device may be provided, including: a processor, a memory, and a network interface, the processor being connected to the memory and the network interface, the network interface being configured to provide a data communication function, the memory being configured to store a computer program, and the processor being configured to invoke the computer program to perform the method according to the aspect in the foregoing embodiment of the disclosure.

According to an embodiment of the disclosure, a non-transitory computer-readable storage medium, storing a computer program including program instructions, the program instructions, when being executed by a processor, performing the method according to the aspect in the foregoing embodiment.

According to an embodiment of the disclosure, a computer program product or a computer program may be provided, including computer instructions, the computer instructions being stored in a computer-readable storage medium. A processor of a computer device reads the computer instructions from the computer-readable storage medium and executes the computer instructions to cause the computer device to perform the method according to the aspect.

Details of one or more embodiments of the disclosure are provided in the accompanying drawings and descriptions below. Other features, objectives, and advantages of the disclosure become apparent from the specification, the drawings, and the claims.

BRIEF DESCRIPTION OF THE DRAWINGS

To describe the technical solutions of embodiments of the disclosure more clearly, the following briefly describes accompanying drawings required for describing the embodiments. The accompanying drawings in the following description show merely some embodiments of the disclosure, and a person skilled in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are merely some rather than all of the embodiments of the disclosure. All other embodiments obtained by a person of ordinary skill in the art based on the embodiments without creative efforts shall fall within the protection scope of the disclosure.

Figure 1:
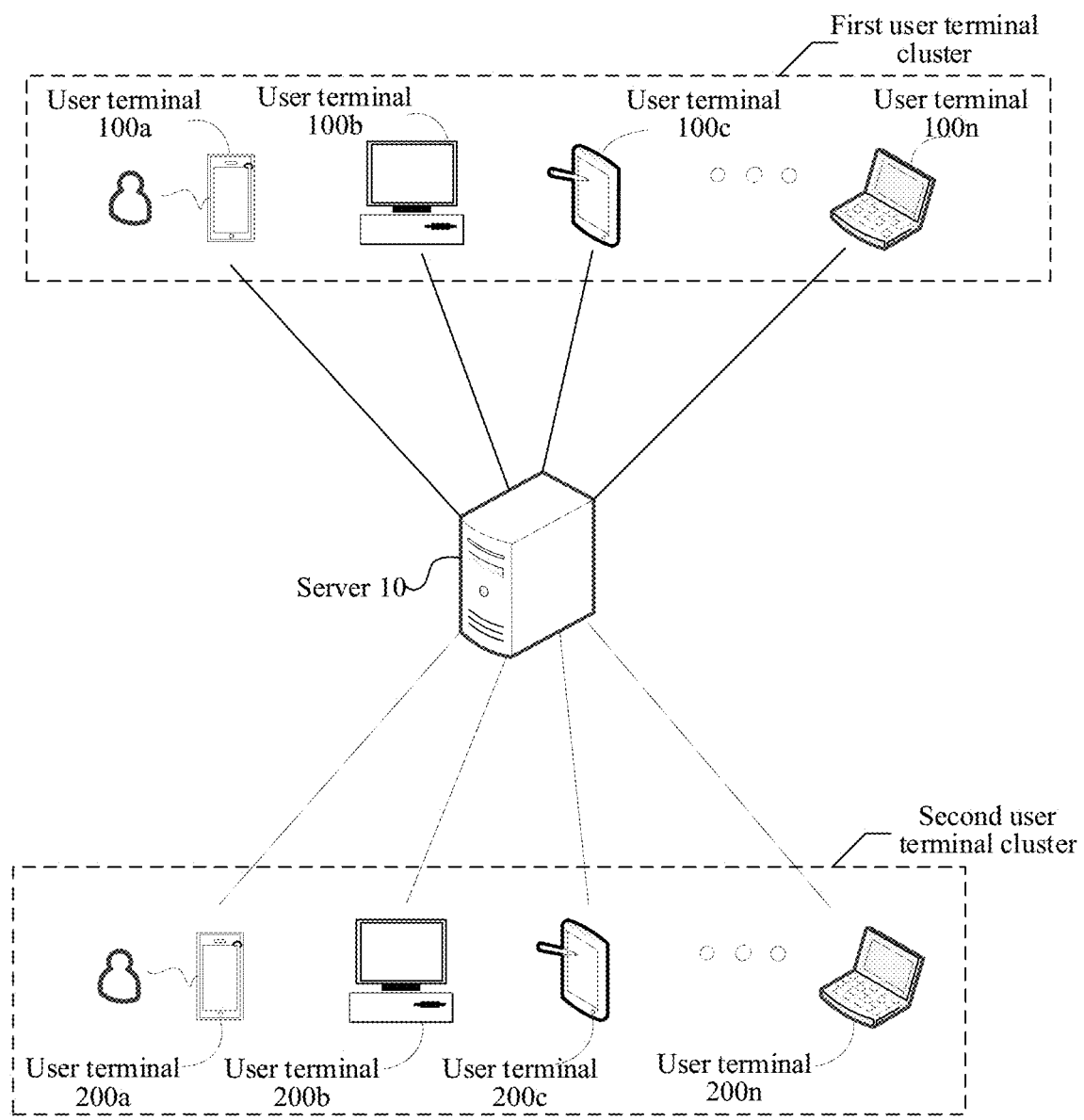
FIG. 1 is a schematic structural diagram of a network architecture according to some embodiments.

FIG. 1 is a schematic structural diagram of a network architecture according to some embodiments. As shown in FIG. 1, the network architecture may include a server 10, a first user terminal cluster, and a second user terminal cluster. The first user terminal cluster may include one or more user terminals. A quantity of user terminals is not limited herein. As shown in FIG. 1, the first user terminal cluster may specifically include a user terminal 100a, a user terminal 100b, a user terminal 100c, . . . , and a user terminal 100n. As shown in FIG. 1, the user terminal 100a, the user terminal 100b, the user terminal 100c, . . . , and the user terminal 100n may each establish a network connection to the server 10, so that each user terminal can exchange data with the server 10 through the network connection.

The second user terminal cluster may include one or more user terminals. A quantity of user terminals is not limited herein. The second user terminal cluster may specifically include a user terminal 200a, a user terminal 200b, a user terminal 200c, . . . , and a user terminal 200n. As shown in FIG. 1, the user terminal 200a, the user terminal 200b, the user terminal 200c, . . . , and the user terminal 200n may each establish a network connection to the server 10, so that each user terminal can exchange data with the server 10 through the network connection.

As shown in FIG. 1, the server 10 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Each user terminal in the first user terminal cluster and the second user terminal cluster may include: an intelligent terminal having a data processing function such as a smartphone, a tablet computer, a notebook computer, a desktop computer, a wearable equipment, a smart household, or a headset. As shown in FIG. 1, a target application (that is, an application client) may be installed on each user terminal in the user terminal cluster. When running in the user terminals, the application client may exchange data with the server 10 shown in FIG. 1 respectively. In this case, the server 10 is a server corresponding to the application client. The application client may be an independent client or may be an embedded sub-client integrated in a client; however, this is not limited herein.

The application client may include a client of a first application platform. The client of the first application platform may be a client in which a communication component (for example, a software development kit (SDK)) is embedded, for example, a multimedia client (for example, a video client), an entertainment client (for example, a game client), an education client, a live streaming client, a news client, or a shopping client (for example, an e-commerce client). In some embodiments, the application client may also include a client of a second application platform having an instant messaging function, for example, a social client (for example, a QQ client or a WeChat client).

The communication component refers to a software development kit that can implement an instant messaging function between users in the application client. The communication component may include functions such as identity verification, message transmitting and receiving, a user interface (UI) of all-in-one (AIO) (a window configured to display chat content of a user) of which a style is customizable, and a new message notification. The communication component is obtained by encapsulating the instant messaging function of the application client (for example, a client Q) of the second application platform by a computer device (for example, the server 10 shown in FIG. 1). The server 10 may be a server corresponding to the client Q. The first application platform is different from the second application platform.

In an example embodiment, one user terminal may be selected from the first user terminal cluster shown in FIG. 1 as a first user terminal. For example, the user terminal 100a shown in FIG. 1 may be used as the first user terminal. The application client (for example, a client X) of the first application platform may run in the first user terminal. A user that accesses the client X by using a user account 1 in the first user terminal may be referred to as a first user, that is, the first user may be a user using the first user terminal. Further, the client X running in the first user terminal may be referred to as a first client. In this case, the first user terminal may exchange data with the server 10 by using a communication component (that is, a first communication component) embedded in the first client.

A user that accesses the client X by using a user account 2 may be referred to as a second user, and a user terminal corresponding to the second user may be referred to as a second user terminal. Further, any user terminal may be selected from the second user terminal cluster shown in FIG. 1 as the second user terminal. For example, the user terminal 200a shown in FIG. 1 may be used as the second user terminal. In some embodiments, the client X running in the second user terminal may be referred to as a second client. In this case, the second user terminal may exchange data with the server 10 by using a communication component (that is, a second communication component) embedded in the second client. Both the first client and the second client may be clients in which the same communication component is embedded. For example, the first client and the second client may be the client X.

Because communication components having instant messaging functions may be embedded into both the first client and the second client, the first user may perform instant communication with the second user in the client X by using the server 10 (that is, the server corresponding to the client Q) corresponding to the communication component. When the first user transmits message data to the second user, in some embodiments, the user account 1 may be referred to as a transmitter user account (that is, an openID of a transmitter), and the user account 2 may be referred to as a receiver user account (that is, an openID of a receiver). The openID is an account unique identifier such as a QQ account, a WeChat account, or a mobile number of a three-party account login system.

Figure 2:
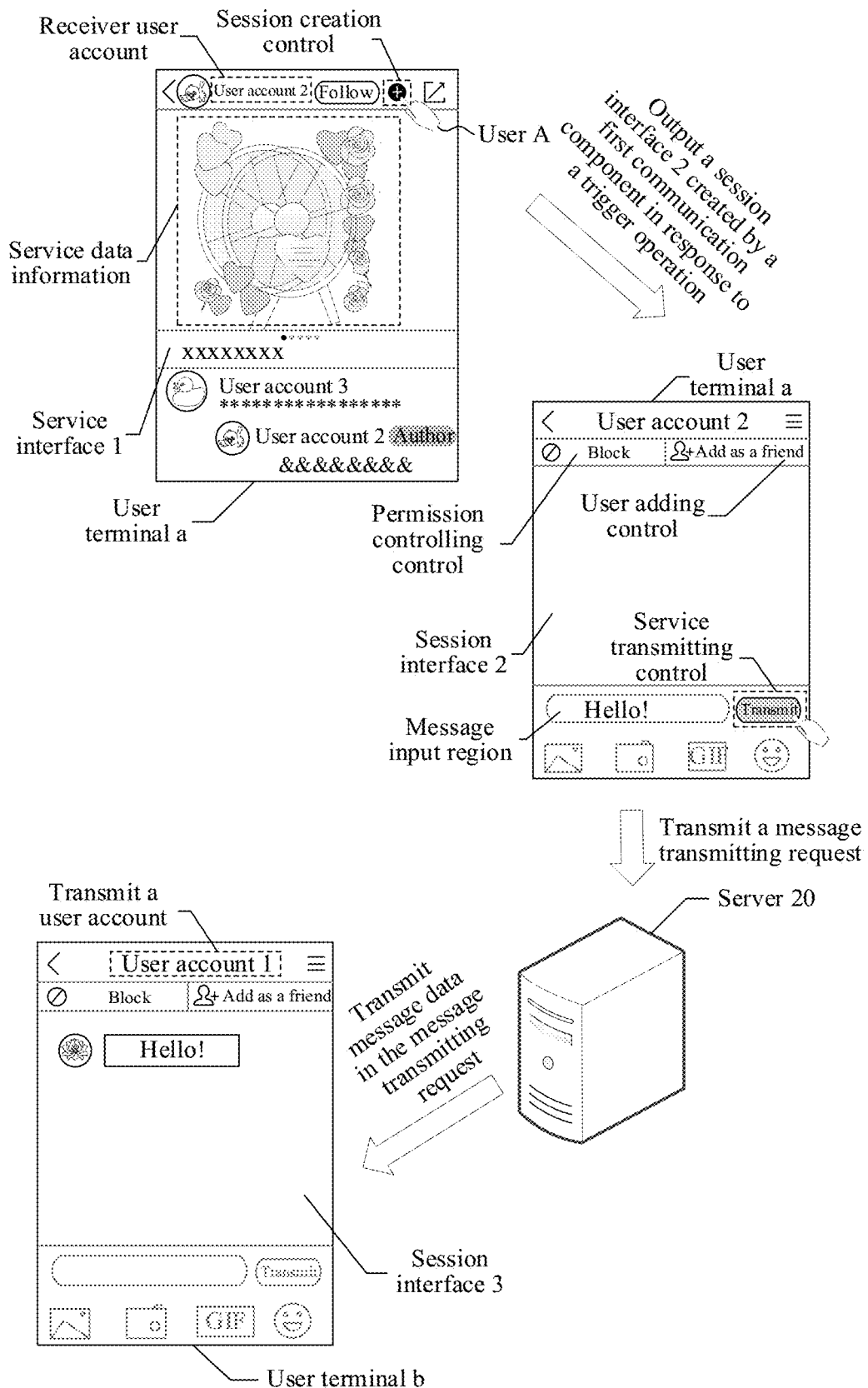
FIG. 2 is a schematic diagram of a scenario of performing data exchange according to some embodiments.

FIG. 2 is a schematic diagram of a scenario of performing data exchange according to some embodiments. As shown in FIG. 2, a client X may run in both a user terminal a and a user terminal b. The client X may be an application client of a first application platform. A communication component embedded in the client X is obtained by encapsulating an instant messaging function of a second application platform by a server 20 (that is, a computer device) shown in FIG. 2. The second application platform is different from the first application platform.

As shown in FIG. 2, the user terminal a may be any one of the user terminals in the first user terminal cluster shown in FIG. 1, for example, the user terminal 100a. The client X running in the user terminal a may be referred to as a first client, and the communication component embedded in the first client may be referred to as a first communication component. The user terminal b may be another user terminal in the second user terminal cluster shown in FIG. 1, for example, the user terminal 200a. The client X running in the user terminal b may be referred to as a second client, and a communication component embedded in the second client may be referred to as a second communication component. In an example embodiment, the computer device may be the server 20. The server 20 may be a server corresponding to the communication component or the server 20 may be the server 10 shown in FIG. 1.

A user account of a user (for example, a user A) corresponding to the user terminal a may be a user account of a third-party account login system used to access the client X, for example, a user account 1. The user account 1 may be referred to as a transmitter user account used for transmitting message data. In an embodiment, a user account of a user (for example, a user B) corresponding to the user terminal b may be a user account of the third-party account login system used to access the client X, for example, a user account 2. The user account 2 may be referred to as a receiver user account used for receiving the message data.

As shown in FIG. 2, data displayed in a service interface (a service interface 1 shown in FIG. 2) of the first client may be service data information released by the user B in the client X. The service data information may be data information such as a text, a video, or a picture released by the user B. The service interface 1 may further include a region in which another user (for example, a user C corresponding to a user account 3) interacts with the user B in the client X. For example, interaction information that the user C comments the service data information released by the user B and data information replied by the user B based on the interaction information may be displayed in the region. The service interface 1 may further include a session creation control shown in FIG. 2.

The user A corresponding to the user terminal a may browse the service data information released by the user B in the service interface 1. In this case, the user A may perform instant communication with the user B in the service interface. When the user A needs to perform instant communication with the user B, the user A performs a trigger operation on a session creation control shown in FIG. 2 and may directly perform a temporary session with the user B without jumping to another client having an instant messaging capability. In addition, a session history, a chat record, and a relationship chain between the user A and the user B may be all stored in the client A. In this case, the user terminal a in which the first client runs may invoke a first communication component corresponding to the session creation control in response to the trigger operation, to output a session interface (for example, a session interface 2 shown in FIG. 2) created by the first communication component. The trigger operation may include a contact operation such as clicking/tapping or long pressing or may include a non-contact operation such as a voice or a gesture. This is not limited herein. As shown in FIG. 2, the session interface 2 may be an interface on which the first client corresponding to the user account 1 performs instant communication with the client corresponding to the user account 2. As shown in FIG. 2, the session interface 2 may include a message input region used for inputting message data, a service transmitting control (for example, a "transmit" control) used for transmitting the message data, a user adding control (for example, a "added as a friend" control) used for adding a friend, and a permission controlling control (for example, a "block" control) used for setting a user permission.

While performing a trigger operation on the user adding control in the session interface 2, the user A may establish a user association relationship (for example, a friend relationship) with the user B corresponding to the user account 2. Further, when performing a trigger operation on the permission controlling control in the session interface 2, the user A may reject the message data transmitted by the user B corresponding to the user account 2. In other words, the user terminal a corresponding to the user A no longer receives any temporary message of the user B.

The user terminal a may obtain to-be-transmitted message data in the session interface 2. The message data may be scenario data information associated with an application scenario of the client X. For example, if the client X is a news client, the scenario data information may be the most popular news link currently. If the client X is a game client, the scenario data information may be a game historical record of the user A. If the client X is a shopping client, the scenario data information may be a commodity shopping link browsed in the service interface 1. In some embodiments, the message data may also be service data information released by the user B in the service interface 1, for example, data information of a picture, a video, text, or audio. In some embodiments, the message data may also be data information inputted by the user A in the message input region in the session interface 2, for example, data information of a picture, a video, text, or audio. The message data may also be data information of another type. This is not limited herein.

As shown in FIG. 2, the user A may input text information of "Hello!" in the message input region in the session interface 2. In this case, the user A may perform a trigger operation on the service transmitting control (for example, the "transmit" control) in the session interface 2, so that the user terminal a may determine the inputted text information as the to-be-transmitted message data in response to the trigger operation. Further, the user terminal a may generate a message transmitting request based on the message data and transmit the message transmitting request to the server 20 corresponding to the first communication component by using the first communication component embedded in the first client.

In this case, the server 20 may transmit, based on the message transmitting request, the message data carried in the message transmitting request to the user terminal b corresponding to the user account 2, so that the user terminal b outputs the message data to a session interface (for example, a session interface 3 shown in FIG. 2) created by the second communication component. The session interface 3 may be an interface on which the second client (for example, the client X) corresponding to the user account 2 performs instant communication with the first client corresponding to the user account 1. In some embodiments, because the server 20 may be a server corresponding to a third client (for example, a social client) different from the client X, the session interface 3 may also be an interface on which the third client (for example, a client Q) corresponding to the user account 2 performs instant communication with the first client corresponding to the user account 1.

In some embodiments, the user A may further perform instant communication with the user C in the service interface 1. The user A may perform a trigger operation on profile picture data of the user C in the service interface 1, so that the user terminal a may output a pop-up window independent of the service interface 1 in response to the trigger operation. The pop-up window may include a session creation control (for example, a "transmit" control). In this case, the user A may perform a trigger operation on the session creation control in the pop-up window, so that the user terminal a may output a session interface used for performing instant communication with the user C in response to the trigger operation and further the user A may rapidly perform instant communication with the user C by using the first communication component.

In some embodiments where the first client in which the communication component (that is, the first communication component) is embedded and the second client in which the communication component (that is, the second communication component) is embedded implement an instant messaging function by using a computer device corresponding to the communication component, reference may be made to the embodiments corresponding to FIG. 3 to FIG. 7.

Figure 3:
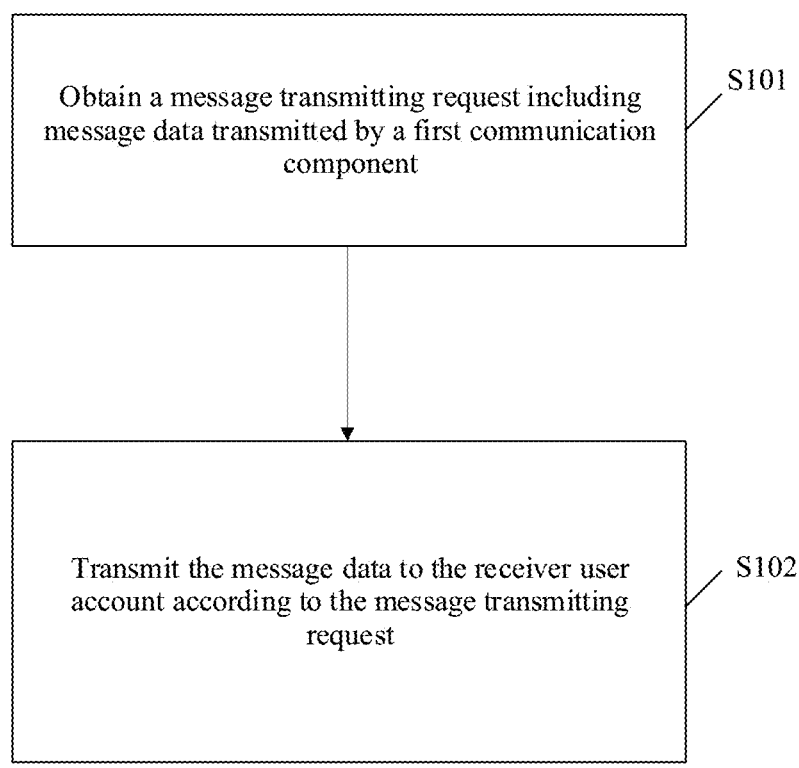
FIG. 3 is a schematic flowchart of a data processing method based on instant messaging according to some embodiments.

FIG. 3 is a schematic flowchart of a data processing method based on instant messaging according to some embodiments. As shown in FIG. 3, the method may be performed by a computer device. The computer device may be a user terminal or may be a server (for example, the server 10 shown in FIG. 1). This is not limited herein. The method may include at least the following operation S101 and operation S102.

Operation S101. Obtain a message transmitting request including message data transmitted by a first communication component.

A communication component having an instant messaging function encapsulated by the computer device may be embedded in a first client running in a first user terminal. The communication component in the first client may be referred to as a first communication component. A first user corresponding to the first user terminal may perform a trigger operation on a session creation control in a service interface of the first client. The service interface may be an interface in a first application platform. The trigger operation may include a contact operation such as clicking/tapping or long pressing or may include a non-contact operation such as a voice or a gesture. This is not limited herein. In this case, the first user terminal in which the first client runs may display, in response to the trigger operation, a session interface created by the first communication component. The session interface may be an interface on which the first client performs instant communication with a client corresponding to a receiver user account. Further, the first user terminal may obtain message data in the session interface, to generate a message transmitting request including the message data. In this case, the first user terminal may transmit the message transmitting request to the computer device (for example, the server 10 shown in FIG. 1) corresponding to the first communication component by using the first communication component.

The computer device may encapsulate an instant messaging function such as a relationship chain, a chat window, a message transmitting and receiving capability in a second application platform to obtain a communication component. The communication component may be independently accessed by an application client (APP), an applet, a web page, and the like in the first application platform, so that the products that independently access the communication component can quickly implement an instant messaging capability. The second application platform is different from the first application platform.

A client (for example, a client X) of the first application platform may access the communication component. When the client X accesses the communication component, a development user (that is, a developer) of the client X may determine corresponding registration information according to a product requirement of the client X. The registration information may include a name of the client X, a client attribute, a session category, a message type, a registration validity period, a communication function, and the like. The client attribute may include an e-commerce type, a news type, a game type, a multimedia type (for example, a short video type), a live streaming type, an education type, and the like. The session category may include: a temporary session (that is, both session parties do not have a friend association relationship), a single chat session, a group chat session, a people nearby session, and the like. The message type may include text, picture, video, audio, and the like. The communication function may include a message transmitting and receiving function, a light interaction function (for example, tickle and liking), an envelope transfer function, an interest recommendation function, a call function (for example, a video call or a voice call), and the like.

When the client X (that is, the first client) commits the registration information by using the first user terminal, the computer device corresponding to the communication component may obtain a component accessing request transmitted by the first client. The component accessing request may include the registration information of the first client. Further, the computer device may obtain, based on the component accessing request, an instant messaging function associated with the registration information from a function set corresponding to the second application platform, and may further encapsulate the obtained instant messaging function, to obtain the first communication component. The computer device may embed the first communication component into the first client.

In some embodiments, the computer device may distribute a channel identifier and channel authorization information corresponding to the channel identifier to the first client based on the registration information of the first client, further establish a mapping relationship between the registration information and the channel identifier, and store the mapping relationship into a mapping relationship table. The channel authorization information may be used for verifying authenticity of the first client. The channel identifier (that is, a channel ID) refers to an authorization character string that can recognize the first client and the session category of the first client. The channel authorization information refers to authorization information corresponding to the channel ID. The channel authorization information may have a validity period of a specific time length. The development user corresponding to the first client may actively transmit an updating request to the computer device by using the first client, so that the computer device may update the channel authorization information, to effectively prevent the channel authorization information from being maliciously used by others.

One session category may correspond to one channel identifier. If the registration information of the first client includes a plurality of session categories, the first client may include a plurality of channel identifiers. For ease of understanding, further, Table 1 is a mapping relationship table provided in an example embodiment, which may be used for indicating a mapping relationship between the registration information and the channel identifier.

As shown in Table 1, registration information 1 may be registration information committed by a client X when accessing a communication component. The registration information 1 of the client X may include two session categories (for example, a session category 1a and a session category 1b). A channel identifier corresponding to the session category 1a may be a channel identifier 10a, and a channel identifier corresponding to the session category 1b may be a channel identifier 10b. Registration information 2 may be registration information committed by a client Y when accessing a communication component. The registration information 2 of the client Y may include one session category (for example, a session category 2a). A channel identifier corresponding to the session category 2a may be a channel identifier 20a. Registration information 3 may be registration information committed by a client Z when accessing a communication component. The registration information 3 of the client Z may include three session categories (for example, a session category 3a, a session category 3b, and a session category 3c). A channel identifier corresponding to the session category 3a may be a channel identifier 30a, a channel identifier corresponding to the session category 3b may be a channel identifier 30b, and a channel identifier corresponding to the session category 3c may be a channel identifier 30c. Table 1 may further include a registration validity period corresponding to each channel identifier and corresponding channel authorization information. A specific presentation manner of Table 1 is not limited herein. The client X, the client Y, and the client Z may be all application clients of the first application platform.

TABLE 1

| Registration Information | Channel Identifier |
| --- | --- |
| Registration information 1 | Channel identifier 10a |
|  | Channel identifier 10b |
| Registration information 2 | Channel identifier 20a |

TABLE 1-continued

| Registration Information | Channel Identifier |
|---|---|
| Registration information 3 | Channel identifier 30a |
| | Channel identifier 30b |
| | Channel identifier 30c |

Figure 4:
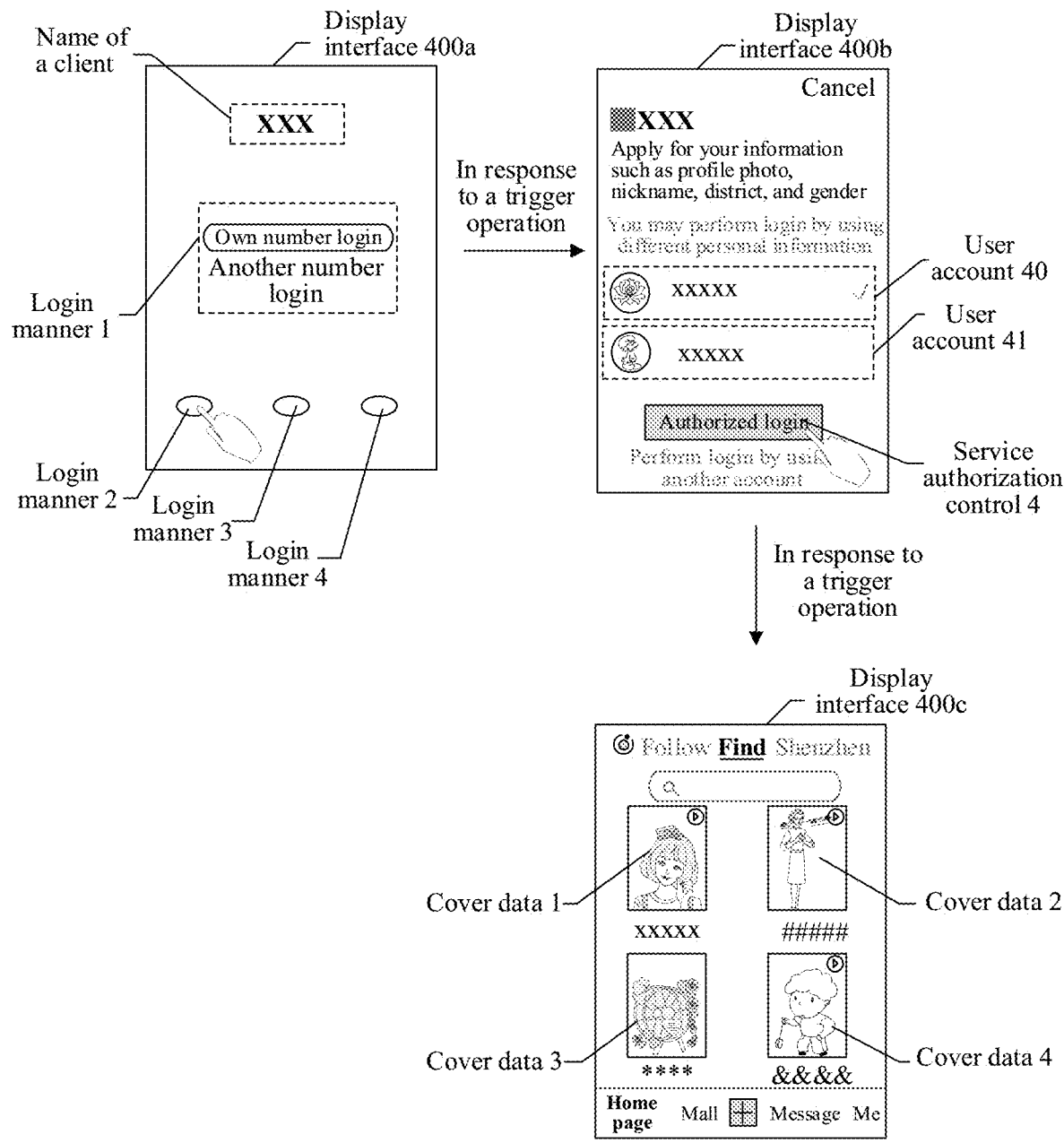
FIG. 4 is a schematic diagram of a scenario of accessing a client in which a communication component is embedded according to some embodiments.

Further, the first user corresponding to the first user terminal in which the first client runs may access the first client by using the user account (for example, a QQ user account 1) of the third-party account login system. FIG. 4 is a schematic diagram of a scenario of accessing a client in which a communication component is embedded according to some embodiments. As shown in FIG. 4, a user terminal may be any one of the user terminals of the first user terminal cluster shown in FIG. 1, for example, the user terminal 100a. A first client (for example, a client X) of a first application platform may run in the user terminal. A communication component embedded in the client X may be obtained by encapsulating an instant messaging function of a second application platform by the computer device. The second application platform is different from the first application platform.

Further, a user corresponding to the user terminal may perform a trigger operation on the client X. The trigger operation may include a contact operation such as clicking/tapping or long pressing or may include a non-contact operation such as a voice or a gesture. This is not limited herein. In this case, the user terminal may further output a display interface 400a shown in FIG. 4 in response to the trigger operation. The display interface 400a may be used for indicating a login manner designated by the user for accessing the client X. As shown in FIG. 4, the display interface 400a may include a plurality of login manners. In some embodiments, four login manners may be used as an example, which may specifically include a login manner 1, a login manner 2, a login manner 3, and a login manner 4. For example, the login manner 1 may indicate that the user performs login by using a mobile number, the login manner 2 may indicate that the user performs login by using a QQ account, the login manner 3 may indicate that the user performs login by using a WeChat account, and the login manner 4 may indicate that the user performs login by using an e-mail account.

As shown in FIG. 4, the user corresponding to the user terminal may perform a trigger operation on the login manner 2 (for example, performing login by using the QQ account). The user terminal may output a display interface 400b shown in FIG. 4 in response to the trigger operation. A plurality of user accounts (two user accounts are used as an example) may be displayed in the display interface 400b. The two user accounts may be a user account 40 and a user account 41. The user accounts displayed in the display interface 400b may be all QQ accounts corresponding to the login manner 2.

The user corresponding to the user terminal may access the client X by using the user account 40. After selecting the user account 40, the user may perform a trigger operation on a service authorization control 4 (for example, an "authorized login" control) in the display interface 400b, to access the client X. Additionally, the user terminal may switch a display interface of the client X from the display interface 400b to a display interface 400c in response to the trigger operation. The display interface 400c may be a display interface corresponding to a home page of the client X.

The client X may all release service data information in the client X. The service data information may be data information such as a video, an image, text, or audio. The user terminal may output cover data corresponding to the service data information in the display interface 400c. As shown in FIG. 4, a plurality of pieces of cover data (for example, four pieces of cover data) may be outputted in the display interface 400c, which may specifically include cover data 1, cover data 2, cover data 3, and cover data 4. The cover data 1 may be cover data corresponding to service data information 1 released by a user 4a in the client X. The cover data 2 may be cover data corresponding to service data information 2 released by a user 4b in the client X. The cover data 3 may be cover data corresponding to service data information 3 released by a user 4c in the client X. The cover data 4 may be cover data corresponding to service data information 4 released by a user 4d in the client X.

An interface size of the display interface 400c is not enough to display the cover data corresponding to the service data information released by all the users in the client X. Therefore, the user may perform a trigger operation (for example, a sliding up operation or a sliding left operation) in the display interface 400c, to browse the service data information released by the remaining users.

Further, the user may perform a trigger operation on cover data (for example, the cover data 3) in the display interface 400c, so that the user terminal may switch the display interface from the display interface 400c to a service interface corresponding to the service data information 3 corresponding to the cover data 3 in response to the trigger operation. The service interface may be the service interface 1 shown in FIG. 2.

For example, when accessing service data information in the service interface corresponding to the first client (for example, the client X) by using a user account 1 in an account system of the second application platform, the first user may perform instant communication with a user (that is, a second user) corresponding to a user account (for example, a user account 2) displayed in the service interface. In this case, when the first user transmits message data to the second user, a user account (for example, the user account 1) for which the first user accesses the first client may be referred to as a transmitter user account, and a user account (for example, the user account 2) displayed in the service interface may be referred to as a receiver user account. The receiver user account may be a user account that releases service data information in the service interface. The receiver user account may alternatively be a user account that interacts with service data information in the service interface. The receiver user account may be an account in the account system of the second application platform used by the second user when accessing the second client of the second user terminal.

The first user may perform a trigger operation on a session creation control in the service interface (for example, the service interface 1 shown in FIG. 2). In this case, the first user terminal in which the first client runs may invoke, in response to the trigger operation, the first communication component embedded in the first client and establish a session relationship between the receiver user account and the transmitter user account in the service interface. Further, the first client may establish, based on the session relationship, a session interface on which the transmitter user account performs instant communication with the receiver user account and may further output the session interface (the session interface 2 shown in FIG. 2).

A communication function in the session interface may be consistent with a communication function in a session interface of a client (for example, a client Q) of the second application platform, that is, may include functions such as file transmission, sticker set, red envelop, voice, transfer, adding to favorites, voice call, video call, and location sharing. Certainly, different templates may be rapidly applied to a style, a pattern, and a layout of the session interface created by the first communication component according to the product requirement of the first client, to optimize the user experience. In other words, when accessing the first communication component, the first client may reset the session interface based on the registration information. The development user of the first client may further delete some functions in the session interface, to make the session interface more fit the product requirement of the first client.

Additionally, the first user may input data information such as a picture, a video, text, or audio in the message input region in the session interface. When the first user performs a trigger operation on the service transmitting control (for example, the "transmit" control in the session interface, the first user terminal in which the first client runs may determine the message data in the session interface as to-be-transmitted message data in response to the trigger operation.

In some embodiments, the to-be-transmitted message data obtained by the first client may further be service data information in the service interface. For example, if the session interface of the first client can be directly communicated with the service data information in the service interface, and when the display interface of the first client is switched from the service interface to the session interface, the first client may directly quote the service data information in the service interface to the session interface and determine the service data information as the to-be-transmitted message data. The service data information may be a picture, a video, text, audio, or the like released by the second user, to rapidly cause a topic for instant communication between the first user and the second user, thereby improving user experience.

In some embodiments, the to-be-transmitted message data obtained by the first client may alternatively be data information preset by the first user. The data information preset by the first user may be a picture, a video, text, audio, or the like. For example, the first user may preset data information such as greeting common word such as "hello!" in the first client. When the display interface of the first client is switched from the service interface to the session interface, the first client may directly determine the data information preset by the first user as the to-be-transmitted message data.

In some embodiments, the to-be-transmitted message data obtained by the first client may alternatively be scenario data information associated an application scenario of the first client. The scenario data information may be obtained when the first user triggers a corresponding interface in the session interface or may be directly obtained by the first client when the first user enters the session interface. An obtaining manner of the scenario data information is not limited herein. For example, if the first client is a news client, the scenario data information may be the most popular news link currently. If the first client is a shopping client, the scenario data information may be a commodity shopping link browsed in the service interface 1. If the first client is a game client, the scenario data information may be a game historical record of the first user.

Figure 5:
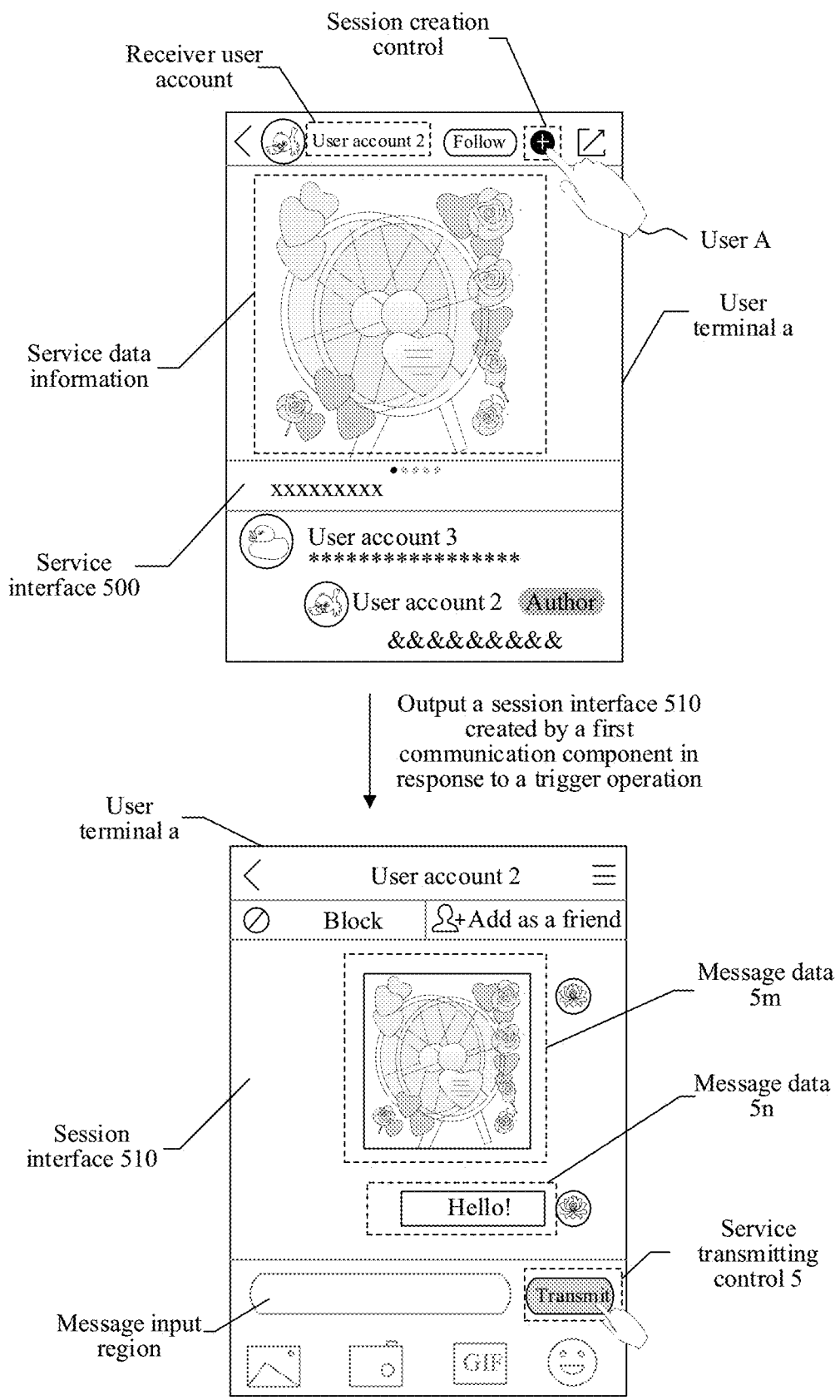
FIG. 5 is a schematic diagram of a scenario of obtaining message data according to some embodiments.

FIG. 5 is a schematic diagram of a scenario of obtaining message data according to some embodiments. As shown in FIG. 5, a user terminal a may be any one of the user terminals of the first user terminal cluster shown in FIG. 1, for example, the user terminal 100a. A client X may run in the user terminal a. The client X may be an application client of a first application platform. A communication component (that is, a first communication component) embedded in the client X is obtained by encapsulating an instant messaging function of a second application platform by a computer device. The second application platform is different from the first application platform.

In an embodiment of the disclosure, a user A corresponding to the user terminal a (that is, the first user terminal) may access the client X (that is, the first client) by using a user account 1 of a third-party account login system. A service interface 500 of the user terminal a may be obtained by performing a trigger operation on the cover data 3 in the display interface 400c shown in FIG. 4 by the user A. A user account 2 may be displayed in the service interface 500, and the user account 2 may be a user account of the third-party account login system used by a user B in a user terminal b (that is, the second user terminal) to access the client X. The user account 1 and the user account 2 are respectively user accounts registered by the user A and the user B on the second application platform. The user A and the user B may respectively log in to the client X of the first application platform by using the user accounts registered on the second application platform in a third-party account login manner. The user A corresponding to the user terminal a may browse service data information released by the user B in the service interface 500. The service data information may be data information such as a picture, a video, text, or audio released by a second user. When the user A transmits message data to the user B for performing instant communication, the user account 1 may be determined as a transmitter user account and the user account 2 may be determined as a receiver user account.

The user A may perform a trigger operation on a session creation control in the service interface 500, so that the user terminal a may invoke a first communication component corresponding to the session creation control in response to the trigger operation, to output a session interface 510 created by the first communication component. The trigger operation may include a contact operation such as clicking/tapping or long pressing or may include a non-contact operation such as a voice or a gesture. This is not limited herein. As shown in FIG. 5, the session interface 510 may be an interface on which a first client corresponding to the user account 1 performs instant communication with a client corresponding to the user account 2.

In this case, the user terminal a may obtain to-be-transmitted message data such as message data 5m and message data 5n in the session interface 510. The message data 5m may be service data information in the service interface 500. If the session interface 510 of the first client can be directly communicated with the service data information in the service interface 500, when the user A performs a trigger operation on the session creation control to enter the session interface 510, the user terminal a may directly quote the service data information in the service interface 500 to the session interface 510 by using the first communication component, and determine the service data information as the to-be-transmitted message data, to rapidly cause a topic for instant communication between the user A and the user B, thereby improving user experience.

The message data 5n may be data information inputted by the user A in a message input region in the session interface 510. The user A may input text information of "Hello!" in the message input region in the session interface 510. In this case, the user A may perform a trigger operation on a service transmitting control 5 (for example, a "transmit" control) in the session interface 510, so that the user terminal a may determine the inputted text information as to-be-transmitted message data in response to the trigger operation.

Additionally, the message data 5n may alternatively be data information preset by the user A in the first client. The data information preset by the user A may be data information such as a picture, a video, text, or audio. For example, the user A may preset data information such as greeting common word such as "hello!" in the first client. When a display interface of the first client is switched from the service interface 500 to the session interface 510, the user terminal a in which the first client runs may directly determine the data information preset by the user A as the to-be-transmitted message data without the trigger operation of the user A.

Further, Table 2 is an interface parameter table of a message transmitting interface of a communication component embedded in the client X (that is, the first client) provided in this embodiment. The first client may invoke the message transmitting interface of the communication component to transmit message data.

to the second application platform). The channel identifier in Table 2 may be represented by a character string. The channel identifier may be the authorized character string that can identify the third-party APP (the client X in which the communication component is embedded) and the session category. The channel authorization information in Table 2 may be represented by a character string. The channel authorization information may be the authorization information (that is, token) corresponding to the channel identifier. As shown in Table 2, the boolean value may be one of "true" or "false". When the boolean value is true, a user terminal in which the client X runs may respond to a trigger operation on a session creation control by using the communication component and further enter a session interface (that is, AIO) on which the receiver user account and the transmitter user account perform instant communication with each other. When the boolean value is false, the user terminal in which the client X runs cannot respond to the trigger operation on the session creation control and further cannot enter the session interface (that is, the AIO) on which the receiver user account and the transmitter user account perform instant communication with each other.

When transmitting the message data by using the message transmitting interface of the first communication component, the client X (that is, the first client) running in the first user terminal needs to conform to an interface parameter of the message transmitting interface shown in Table 2. The

TABLE 2

| Parameter Items | Parameter Types | Parameter Description |
| --- | --- | --- |
| Message data | Binary | The message data includes message data formats such as text, picture, video, and audio supported by the communication component |
| Message type | Integer | Message types such as text and picture |
| Transmitter openID | Character string | The openID is from a user identifier of a third-party account login system |
| Receiver openID | Character string | The openID is from a user identifier of a third-party account login system |
| Channel identifier | Character string | Authorized character string that can identify a third-party APP and a session category |
| Channel authorization information | Character string | Authorization information corresponding to the channel identifier |
| Invoke AIO | Boolean value | Determine to enter a session interface |

As shown in Table 2, the message data in Table 2 may be represented in a form of binary. The message data may be the to-be-transmitted message data obtained by the client X and include message data formats such as text, picture, video, and audio supported by the communication component. The message type in Table 2 may be represented in a form of integer. The message type may include message types such as text and picture. The transmitter openID (that is, the transmitter user account) in Table 2 may be represented by a character string. The transmitter openID may be the user identifier in the third-party account login system of the first user accessing the client X (for example, a user identifier such as a QQ account, a WeChat account, a mobile number, or an e-mail account of the first user logging in to the second application platform). The receiver openID (that is, the receiver user account) in Table 2 may be represented by a character string. The receiver openID may be the user identifier in the third-party account login system of the second user accessing the client X (for example, a user identifier such as a QQ account, a WeChat account, a mobile number, or an e-mail account of the second user logging in first user terminal may obtain a channel identifier and channel authorization information corresponding to the channel identifier. At the same time, the first user terminal may further obtain a receiver user account displayed in the service interface. The channel identifier is an identifier distributed by the server corresponding to the first communication component in a case that the first client obtains the first communication component. The channel authorization information may be used for determining authenticity of the first client.

Further, the first user terminal in which the first client runs may determine service authentication auxiliary information corresponding to the message data based on the obtained channel identifier, the obtained channel authorization information, and the receiver user account. The service authentication auxiliary information may further include a message type corresponding to the message data, the transmitter user account, and a boolean value for invoking a session interface. The first user terminal may generate, based on the service authentication auxiliary information and the message data, a message transmitting request to be transmitted to the server (that is, the computer device). In this case, the computer device may obtain the message transmitting request.

Operation S102. Transmit the message data to the receiver user account according to the message transmitting request.

Specifically, the computer device may obtain the service authentication auxiliary information in the message transmitting request. The service authentication auxiliary information may include the receiver user account and the transmitter user account. The transmitter user account is a user account corresponding to the first client. Further, the computer device may determine a user permission corresponding to the receiver user account. The user permission may be used for indicating a permission to transmit and receive the message data between the receiver user account and the transmitter user account. The computer device may perform authentication on the message transmitting request based on the service authentication auxiliary information in a case that the user permission is a message transmittable and receivable permission. The computer device may transmit the message data to a client corresponding to the receiver user account in a case that the authentication on the message transmitting request succeeds.

Figure 6:
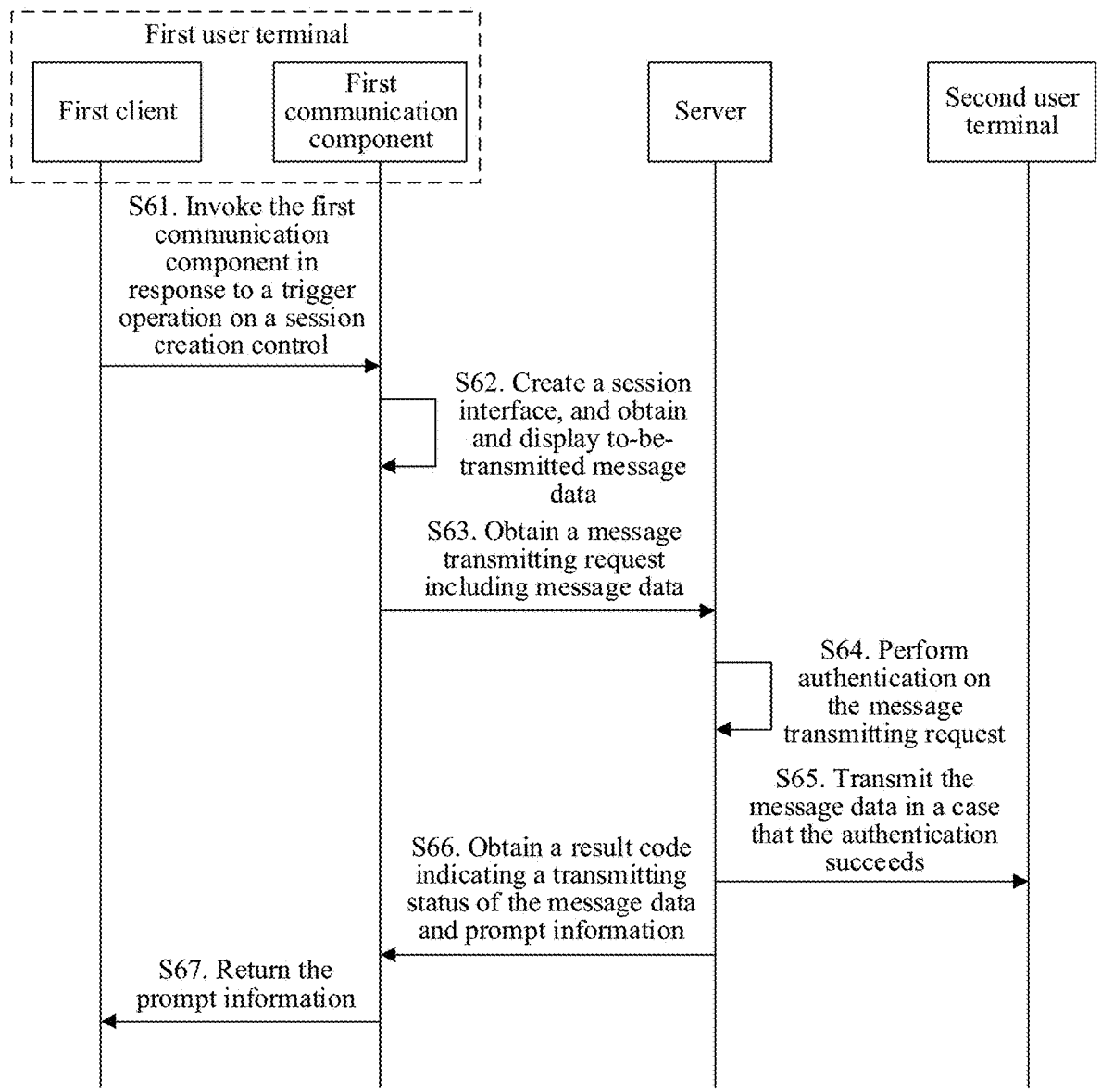
FIG. 6 is a timing diagram of transmitting message data according to some embodiments.

FIG. 6 is a timing diagram of transmitting message data according to some embodiments. As shown in FIG. 6, the first user terminal may be a user terminal corresponding to a transmitter user account. A client X (that is, a first client) of a first application platform may run in the first user terminal. A first communication component embedded in the first client is obtained by encapsulating an instant messaging function of an application client (for example, a client Q) of a second application platform by a server (that is, the computer device) shown in FIG. 6. The second application platform is different from the first application platform. A second user terminal shown in FIG. 6 may be a user terminal corresponding to a receiver user account. The client X (that is, a second client) of the first application platform may run in the second user terminal. A client Q (that is, a third client) of the second application platform may further run in the second user terminal. The server shown in FIG. 6 may be a server corresponding to the third client. The server may be the server 10 shown in FIG. 1.

When a first user transmits message data to a second user corresponding to the receiver user account, a user account (for example, a user account 1) of a third-party account login system used when the first user accesses the first client may be referred to as a transmitter user account. The first user terminal may perform operation S61 shown in FIG. 6, that is, may invoke the first communication component embedded in the first client in response to a trigger operation of the first user on a session creation control. Further, the first user terminal may perform operation S62 by using the first communication component, that is, creates a session interface on which the receiver user account and the transmitter user account perform instant communication with each other and then may obtain and display to-be-transmitted message data in the session interface.

The first user terminal may perform operation S63 by using the first communication component, that is, transmits a message transmitting request including the message data to a server corresponding to the first communication component. When the server obtains the message transmitting request, the server may perform operation S64, that is, performs authentication on the message transmitting request. The authentication process may include authenticating legality of an account, a channel permission, a relationship chain permission, and the like. Further, in a case that the authentication on the message transmitting request succeeds, the server may perform operation S65, that is, transmit the message data in the message transmitting request to a second user terminal corresponding to the receiver user account. The server may perform operation S66, that is, obtain a result code indicating a transmitting status of the message data and prompt information generated based on the result code, and may further perform operation S67 by using the first communication component, that is, return the prompt information to the first user terminal.

Further, the development user of the client X in which the communication component is embedded may newly add a chat permission control, so that a user (for example, a user A) in the client X can set a user permission. That is, the user A may set a user that can perform instant communication in the client X, to effectively avoid harassment information, thereby improving the user experience. For example, in the session interface 2 shown in FIG. 2, the user A may perform a trigger operation on the permission controlling control (for example, the "block" control), so that the user B corresponding to the user account 2 cannot transmit message data to the user A.

Therefore, when the computer device receives a message transmitting request transmitted by the first client, the computer device needs to obtain service authentication information in the message transmitting request, to determine a user permission of a receiving user (that is, the second user) corresponding to a receiver user account in the service authentication information. If the user permission is a message untransmittable and unreceivable permission, the computer device cannot transmit the message data in the message transmitting request to the receiver user account. If the user permission is a message transmittable and receivable permission, the computer device may determine that the message data can be transmitted to the receiver user account.

If the user permission is the message transmittable and receivable permission, the computer device may perform authentication on the message transmitting request based on the service authentication auxiliary information. The computer device may obtain a to-be-matched channel identifier and to-be-matched channel authorization information in the service authentication auxiliary information, to determine authenticity of the first client, thereby effectively preventing others from maliciously replacing the first client to transmit illegal message data. The computer device may query the to-be-matched channel identifier based on the mapping relationship table (for example, Table 1). In a case that a channel identifier the same as the to-be-matched channel identifier is queried from the mapping relationship table, the channel identifier the same as the to-be-matched channel identifier is used as a target channel identifier. Further, the computer device may obtain target channel authorization information corresponding to the target channel identifier. When the to-be-matched channel authorization information is different from the target channel authorization information, the computer device may determine that the first client does have authenticity. When the to-be-matched channel authorization information is the same as the target channel authorization information, the computer device may determine that the first client has the authenticity.

When the computer device determines that the first client has the authenticity, the computer device may obtain target registration information corresponding to the target channel identifier from the mapping relationship table shown in Table 1 and may further match the service authentication auxiliary information and the target registration information, to obtain a matching result. The computer device may determine that the authentication on the message transmitting request succeeds in a case that the matching result indicates that the matching between the service authentication auxiliary information the target registration information succeeds. The computer device may determine that the authentication on the message transmitting request fails in a case that the matching result indicates that the matching between the service authentication auxiliary information and the target registration information fails.

For example, the computer device may query a target channel identifier (for example, a channel identifier 10a) the same as the to-be-matched channel identifier in the mapping relationship table shown in Table 1. When the computer device determines that the first client has the authenticity, the computer device may obtain registration information 1 (target registration information) corresponding to the channel identifier 10a. The registration information 1 may be registration information committed by the client X when accessing the communication component. The registration information may specifically include a name of the first client (for example, the client X), a client attribute (for example, a game type), a session category (for example, a group chat category and a single chat category), a message type (for example, text and picture), a registration validity period (for example, Aug. 30, 2020), a communication function (for example, a game record sharing function and a message transmitting and receiving function), and the like. The session category corresponding to the channel identifier 10a is a session category 1a (for example, the single chat category).

The computer device may match the service authentication auxiliary information and the target registration information, to obtain a matching result. For example, when message data in the service authentication auxiliary information obtained by the computer device is video data, the matching result obtained by the computer device may indicate that the matching between the service authentication auxiliary information the target registration information fails. When a session category in the service authentication auxiliary information obtained by the computer device is a people nearby category, the matching result obtained by the computer device may indicate that the matching between the service authentication auxiliary information the target registration information fails. For example, when the session category in the service authentication auxiliary information obtained by the computer device is the single chat category and the message type of the message data is text, the matching result obtained by the computer device may indicate that the matching between the service authentication auxiliary information and the target registration information succeeds.

Further, Table 3 is an interface parameter table of a message receiving interface of a communication component embedded in the client X (that is, the second client) provided in some embodiments. As shown in Table 3, message data in Table 3 may be represented in a form of binary. The message data may be to-be-transmitted message data obtained by the client X and include message data formats such as text, picture, video, and audio supported by the communication component. A message type in Table 3 may be represented in a form of integer. The message type may include message types such as text and picture. A transmitter openID (that is, the transmitter user account) in Table 3 may be represented by a character string. The transmitter openID may be a user identifier in a third-party account login system of the first user accessing the client X (for example, a QQ account, a WeChat account, a mobile number, or an e-mail account). Channel information in Table 3 may be represented by a character string. The channel information may be used for indicating a source of message data.

TABLE 3

| Parameter Items | Parameter Types | Parameter Description |
| --- | --- | --- |
| Message data | Binary | The message data includes message data formats such as text, picture, video, and audio supported by the communication component |
| Message type | Integer | Message types such as text and picture |
| Transmitter openID | Character string | The openID is from a user identifier of a third-party account login system |
| Channel information | Character string | Information such as a source of message data |

When receiving the message data by using the second communication component embedded in the second client, the second user terminal corresponding to the receiver user account needs to conform to an interface parameter of the message receiving interface shown in Table 3 When the authentication on the message transmitting request succeeds, the computer device may use the target registration information corresponding to the target channel identifier queried in the mapping relationship table as channel information and may further generate a message packet according to the channel information and the message data. For example, the computer device may package the channel information and the message data, to obtain the message packet.

Further, the computer device may transmit the message packet to the second user terminal corresponding to the receiver user account. The computer device may transmit the message packet to the second client (for example, the client X) corresponding to the receiver user account, and the second communication component embedded in the second user terminal decapsulates the message packet, to obtain the channel information and the message data. The channel information may be used for indicating a source of the message data determined by the second client. The second user terminal displays the message data in a session interface created by the second communication component. The second client is a client of the first application platform.

For example, the second user terminal in which the second client runs may generate a new message notification such as "a nearby friend in the client X transmits a new message, please check it in time" based on the channel information. If a display interface of the second client is a session interface on which the receiver user account performs instant communication with the transmitter user account, the second user terminal may directly output, by using the second communication component, message data obtained through decapsulation to the session interface. If the display interface of the second client is not the session interface on which the receiver user account performs instant communication with the transmitter user account, the second user terminal may output the new message notification, to prompt a second user corresponding to the second user terminal to quickly reply to the received message data.

In some embodiments, the computer device may transmit the message packet to a third client (for example, the client Q) corresponding to the receiver user account, and the third client decapsulates the message packet, to obtain the channel information and the message data. The channel information may be used for indicating a source of the message data determined by the third client. The message data is displayed in a session interface corresponding to the third client. The third client is a client of the second application platform.

For example, the second user terminal in which the third client runs may generate a new message notification such as "a nearby friend in the client X transmits a new message, please check it in time" based on the channel information. The second user terminal may output the new message notification, to prompt the second user that accesses the third client by using the receiver user account to quickly reply to the received message data. The second user may directly reply to the message data in the third client, so that the computer device may transmit the replied message data to the first client in which the first communication component is embedded.

Further, the computer device may determine a transmitting status of the message data and return a transmitting result corresponding to the transmitting status by using a notification or call-back. For a specific parameter, reference may be made to Table 4. Table 4 is a parameter table of a transmitting result provided in some embodiments.

TABLE 4

| Return Items | Data Type | Description |
| --- | --- | --- |
| Result code | Integer | Result code indicating a transmitting status |
| Prompt information | Character string | Text description indicating a transmitting result |

As shown in Table 4, the result code may be represented in a form of integer. The result code may be used for indicating a transmitting status of message data. The transmitting status of the message data may include a successful transmitting state and a failure transmitting state. In an embodiment of the disclosure, the result code used for indicating the successful transmitting state may be referred to as a first result code (for example, a result code 0), and prompt information corresponding to the first result code may be referred to as success prompt information. In this embodiment, the result code used for indicating the failure transmitting state may be referred to as a second result code, and prompt information corresponding to the second result code may be referred to as abnormality prompt information. One second result code may correspond to a reason of a failure transmitting state. For example, a result code 101 may indicate that a time for the first client to transmit message data exceeds a validity period. A result code 102 may indicate that a message type of the message data transmitted by the first client is not supported by the first communication component. A result code 103 may indicate that the first client does not have authenticity. A result code 104 may indicate that a session type of the message data transmitted by the first client is not supported by the first communication component. A result code 105 may indicate that the first user corresponding to the first client does not have a user permission to transmit message data to the second user.

Further, the computer device obtains, in a case that a transmitting status of the message data is a successful transmitting state, a first result code used for indicating the successful transmitting state, and returns success prompt information corresponding to the first result code to the first user terminal in which the first client runs. The computer device obtains, in a case that the transmitting status of the message data is a failure transmitting state, a second result code used for indicating the failure transmitting state, and returns abnormality prompt information corresponding to the second result code to the first user terminal in which the first client runs. For example, if a registration validity period of the first client is Aug. 30, 2020, a date when the first client transmits message data is Sep. 10, 2020, that is, the registration validity period expires. In this case, the computer device may obtain a second result code (for example, the result code 101) used for indicating that the registration validity period becomes invalid and return abnormality prompt information corresponding to the result code to the first user terminal. The abnormality prompt information may be "due to a failure of an instant messaging function of this client, your account cannot transmit message data temporarily!"

In some embodiments, the computer device may encapsulate the instant messaging function of the second application platform different from the first application platform, to obtain the first communication component embedded in the first client. The first communication component may be embedded in the first client (for example, the client X) of the first application platform. In a case that a transmitting user logs in to the first client by using a user account registered on the second application platform in a third-party account login manner, the first communication component may create a session interface on which a receiver user account performs instant communication with a transmitter user account in the first client. When the receiver user account performs instant communication with the transmitter user account, the first client corresponding to the transmitter user account may directly invoke the first communication component embedded in the first client to create the session interface on which the receiver user account performs instant communication with the transmitter user account, and may further obtain message data in the session interface and transmit a message transmitting request including the message data to the computer device. Further, the computer device may transmit the message data to the receiver user account according to the received message transmitting request, so that when a user transmits message data to another user (that is, a user corresponding to the receiver user account) by using the transmitter user account, the computer device may rapidly perform data exchange between the receiver user account and the transmitter user account, to assign an instant messaging capability to the two user accounts, thereby improving efficiency of instant communication.

Figure 7:
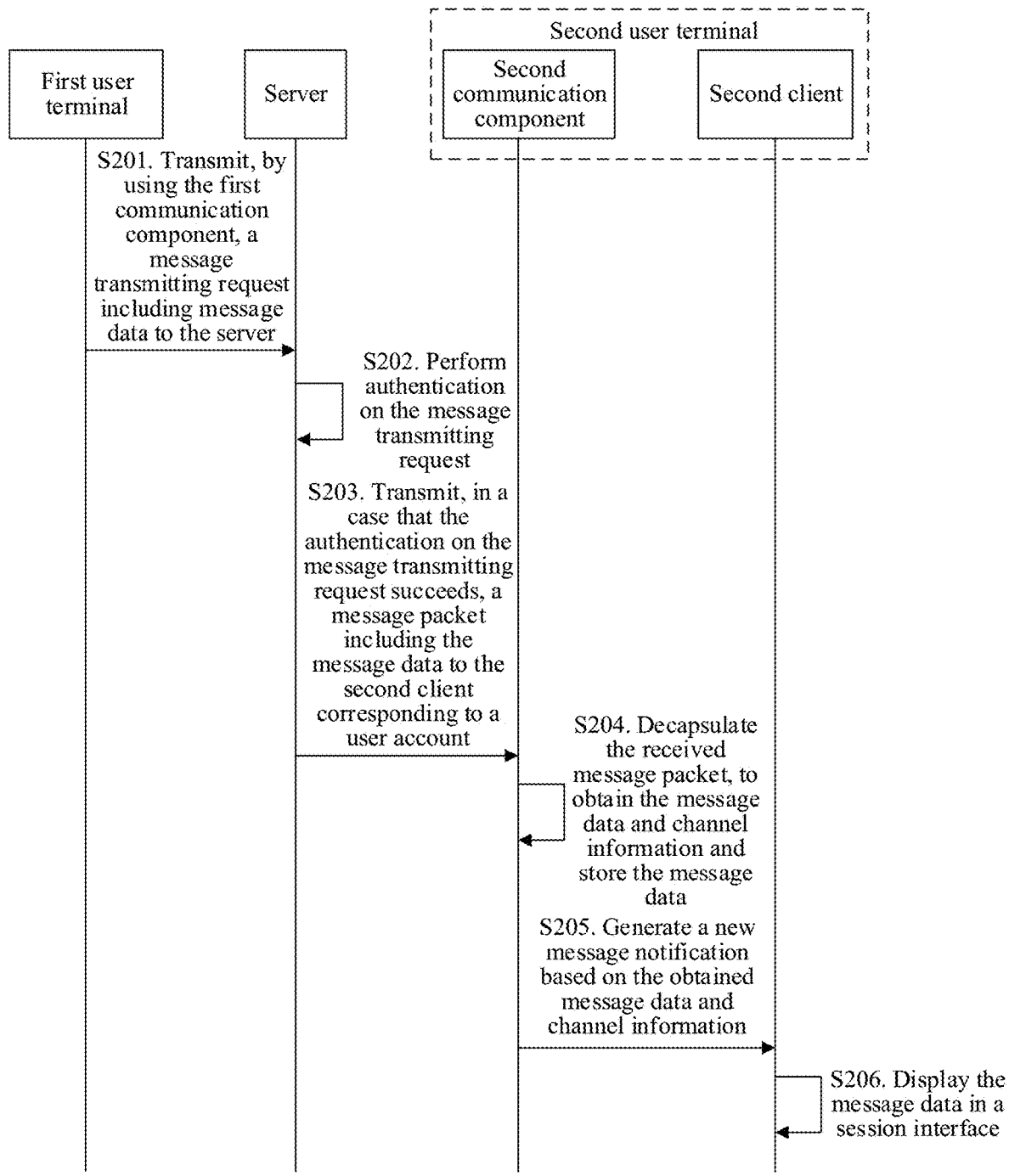
FIG. 7 is a schematic flowchart of a data processing method based on instant messaging according to some embodiments.

FIG. 7 is a schematic flowchart of a data processing method based on instant messaging application according to some embodiments. As shown in FIG. 7, the method may be performed by a first user terminal in which a first client runs, a second user terminal in which a second client runs, and a computer device (a server shown in FIG. 7) jointly. The first user terminal may be any one of the user terminals in the first user terminal cluster shown in FIG. 1, for example, the user terminal 100a. The second user terminal may be any one of the user terminals in the second user terminal cluster shown in FIG. 1, for example, the user terminal 200a. The server may be the server 10 shown in FIG. 1. In this embodiment, both the first client and the second client may be application clients (for example, a client X) of a first application platform. A communication component embedded in the first client may be referred to as a first communication component, and a communication component embedded in the second client may be referred to as a second communication component. During instant communication through a communication component, in some embodiments, a user account (for example, a user account 1) corresponding to a first user accessing the first client may be determined as a transmitter user account, and a user account corresponding to a second user (for example, a user 2) accessing the second client may be determined as a receiver user account. The method may include at least the following operation S201 to operation S206.

Operation S201. A first client run by a first user terminal transmits, by using a first communication component, a message transmitting request including message data to a server.

Operation S202. The server performs authentication on the message transmitting request.

Operation S203. The server transmits, in a case that the authentication on the message transmitting request succeeds, a message packet including the message data to a second user terminal in which a second client corresponding to a receiver user account runs.

Operation S204. The second user terminal decapsulates the received message packet by using a second communication component, to obtain the message data and channel information and stores the message data.

Operation S205. The second user terminal generates a new message notification based on the obtained message data and channel information and by using the second communication component.

Operation S206. The second user terminal displays the message data in a session interface.

For a specific implementation of operation S201 to operation S206, reference may be made to the description of operation S101 and operation S102 in the foregoing embodiment corresponding to FIG. 3, and details are not described herein again.

When performing instant communication with the second user corresponding to the receiver user account, the first user corresponding to the transmitter user account may further apply to add the second user as a friend, to help subsequently perform instant communication, and the first user may perform a trigger operation on a user adding control (for example, the "add as a friend" control shown in FIG. 2) in the session interface of the first client, so that the first user terminal may transmit a user adding request to the computer device (that is, the server shown in FIG. 7) corresponding to the first communication component in response to the trigger operation.

In this case, the computer device may transmit the user adding request to the second client (for example, the client X running in the second user terminal) corresponding to the receiver user account or the third client (for example, the client Q running in the second user terminal) corresponding to the receiver user account. Both the first client and the second client are a same application client (that is, the client X) of a first application platform, and the third client is an application client (that is, the client Q) having an instant messaging function of a second application platform. The first application platform is different from the second application platform.

When the second user corresponding to the receiver user account passes through the user adding request, the second user terminal corresponding to the second client to which the receiver user account belongs may respond to the user adding request, so that the computer device may establish a user association relationship between the receiver user account and the transmitter user account, that is, in the client X, the first user successfully adds the second user as a friend. For example, if the transmitter user account is a user account (for example, a QQ account) of a third-party account login system used for accessing the client X, and the receiver user account is a user account (for example, a WeChat account) of another third-party account login system used for accessing the client X, a user association relationship (for example, a friend relationship) may be established between the first user corresponding to the transmitter user account and the second user corresponding to the receiver user account in the client X for performing instant communication.

In some embodiments, if the transmitter user account and the receiver user account are user accounts (for example, QQ accounts) of a same third-party account login system (for example, an account system of the client Q) used for accessing the client X, the user association relationship may be established between the receiver user account and the transmitter user account in the client X and in the third client (for example, the client Q). For example, the receiver user account may be a user account (for example a QQ user account 1) distributed by the computer device when the second user first accesses the client Q. The transmitter user account may be a user account (for example, a QQ user account 2) distributed by the computer device when the first user first accesses the same client Q. Further, when the second user corresponding to the receiver user account passes through the user adding request, the user association relationship may also be established between the receiver user account and the transmitter user account in the client Q, that is, the first user successfully adds the second user as a friend. In an example embodiment, based on a relationship chain system of the client Q, the client X does not need to find and establish a relationship chain, so that the instant messaging capability of the client X may promote continuous activity and retention of a user in the client X.

In some embodiments, the computer device may encapsulate the instant messaging function of the second application platform different from the first application platform, to obtain the first communication component embedded in the first client. Further, the first communication component may be embedded in the first client (for example, the client X) of the first application platform. The first communication component may create a session interface on which a receiver user account performs instant communication with a transmitter user account in the first client. When the receiver user account performs instant communication with the transmitter user account, the first client corresponding to the transmitter user account may directly invoke the first communication component embedded in the first client to create the session interface on which the receiver user account performs instant communication with the transmitter user account, and may further obtain message data in the session interface and transmit a message transmitting request including the message data to the computer device. Further, the computer device may transmit the message data to the receiver user account according to the received message transmitting request, so that when a user transmits message data to another user (that is, a user corresponding to the receiver user account) by using the transmitter user account, the computer device may rapidly perform data exchange between the receiver user account and the transmitter user account, to assign an instant messaging capability to the two user accounts, thereby improving efficiency of instant communication.

Figure 8:
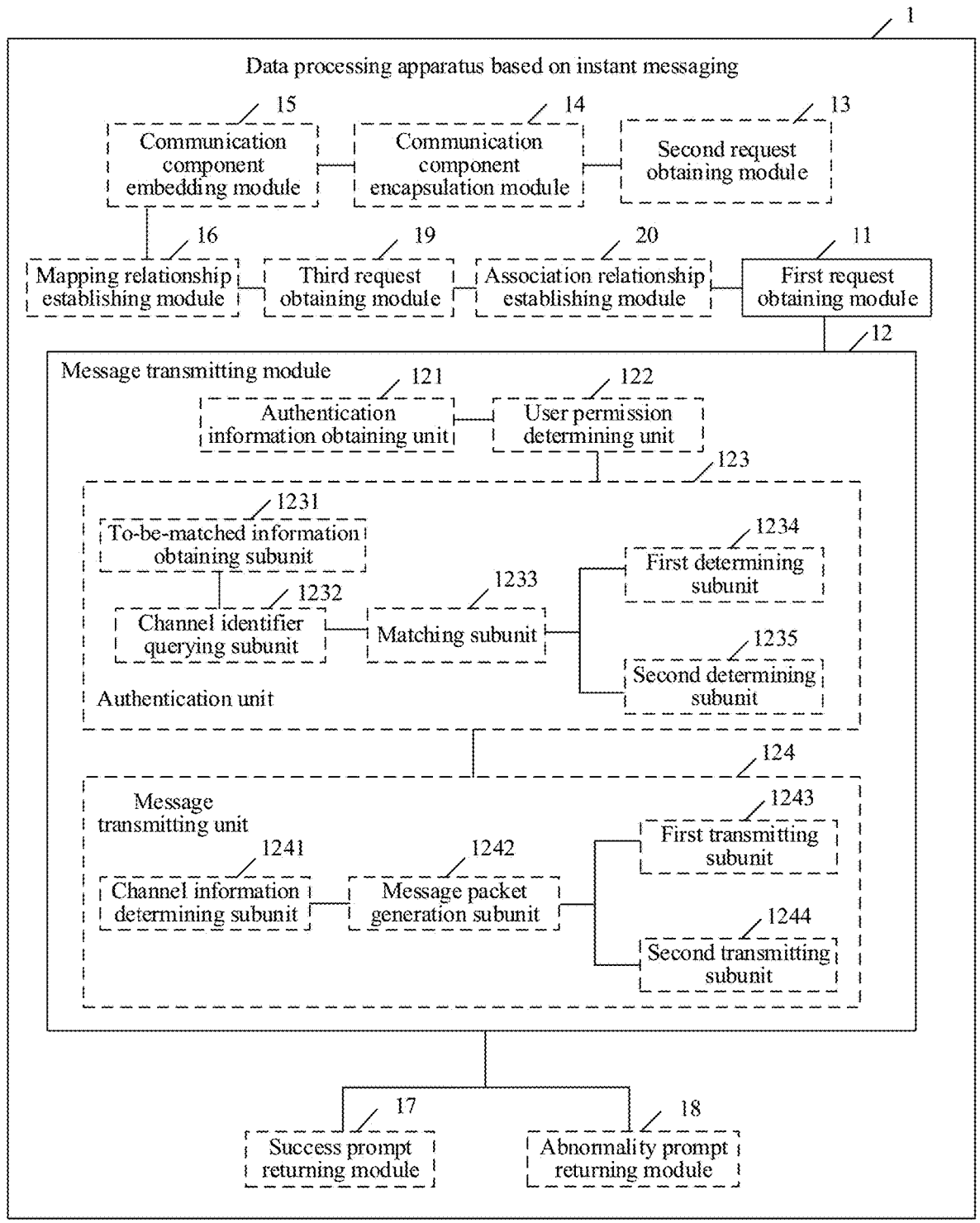
FIG. 8 is a schematic structural diagram of a data processing apparatus based on instant messaging according to some embodiments.

FIG. 8 is a schematic structural diagram of a data processing apparatus 1 based on instant messaging according to some embodiments. The data processing apparatus 1 based on instant messaging may be a computer program (including program code) run on a computer device. For example, the data processing apparatus 1 based on instant messaging is application software. The data processing apparatus 1 based on instant messaging may be configured to perform the corresponding operations in the method provided in the embodiments of the disclosure. As shown in FIG. 8, the data processing apparatus 1 based on instant messaging may run in a computer device having an instant messaging function. The data processing apparatus 1 based on instant messaging may include a first request obtaining module 11 and a message transmitting module 12.

The first request obtaining module 11 is configured to obtain a message transmitting request including message data transmitted by a first communication component. The first communication component is embedded in a first client of a first application platform. The first communication component is obtained by encapsulating an instant messaging function of a second application platform. The second application platform is different from the first application platform. In response to a trigger operation on a session creation control in a service interface of the first client, the first client invokes the first communication component and displays a session interface created by the first communication component; and obtains the message data in the session interface, generates the message transmitting request including the message data, and transmits the message transmitting request to the server by using the first communication component. The session interface is an interface on which a transmitter user account corresponding to the first client performs instant communication with a receiver user account. The transmitter user account is a user account corresponding to the second application platform and logging in to the first client in a third-party account login manner.

The message transmitting module 12 is configured to transmit the message data to the receiver user account according to the message transmitting request. The message transmitting request includes service authentication auxiliary information corresponding to the message data.

The message transmitting module 12 may include: an authentication information obtaining unit 121, a user permission determining unit 122, an authentication unit 123, and a message transmitting unit 124.

The authentication information obtaining unit 121 is configured to obtain the service authentication auxiliary information in the message transmitting request. The service authentication auxiliary information includes the receiver user account and the transmitter user account. The transmitter user account is a user account corresponding to the first client.

The user permission determining unit 122 is configured to determine a user permission corresponding to the receiver user account. The user permission is used for indicating a permission to transmit and receive the message data between the receiver user account and the transmitter user account.

The authentication unit 123 is configured to perform authentication on the message transmitting request based on the service authentication auxiliary information in a case that the user permission is a message transmittable and receivable permission.

The authentication unit 123 includes: a to-be-matched information obtaining subunit 1231, a channel identifier querying subunit 1232, a matching subunit 1233, a first determining subunit 1234, and a second determining subunit 1235.

The to-be-matched information obtaining subunit 1231 is configured to obtain a to-be-matched channel identifier and to-be-matched channel authorization information in the service authentication auxiliary information in a case that the user permission is the message transmittable and receivable permission.

The channel identifier querying subunit 1232 is configured to query the to-be-matched channel identifier based on the mapping relationship table, and use, in a case that a channel identifier the same as the to-be-matched channel identifier is queried from the mapping relationship table, the channel identifier the same as the to-be-matched channel identifier as a target channel identifier.

The matching subunit 1233 is configured to obtain target channel authorization information corresponding to the target channel identifier, obtain target registration information corresponding to the target channel identifier from the mapping relationship table in a case that the to-be-matched channel authorization information is the same as the target channel authorization information, and match the service authentication auxiliary information and the target registration information, to obtain a matching result.

The first determining subunit 1234 is configured to determine that the authentication on the message transmitting request succeeds in a case that the matching result indicates that the matching between the service authentication auxiliary information and the target registration information succeeds.

The second determining subunit 1235 is configured to determine that the authentication on the message transmitting request fails in a case that the matching result indicates that the matching between the service authentication auxiliary information and the target registration information fails.

For specific implementations of the to-be-matched information obtaining subunit 1231, the channel identifier querying subunit 1232, the matching subunit 1233, the first determining subunit 1234, and the second determining subunit 1235, reference may be made to the description of performing authentication on the message transmitting request in the foregoing embodiment corresponding to FIG. 3, and details are not described herein again.

The message transmitting unit 124 is configured to transmit the message data to the receiver user account in a case that the authentication on the message transmitting request succeeds.

The message transmitting unit 124 includes: a channel information determining subunit 1241, a message packet generation subunit 1242, a first transmitting subunit 1243, and a second transmitting subunit 1244.

The channel information determining subunit 1241 is configured to use, in a case that the authentication on the message transmitting request succeeds, the target registration information corresponding to the target channel identifier queried from the mapping relationship table as channel information.

The message packet generation subunit 1242 is configured to generate a message packet according to the channel information and the message data.

The first transmitting subunit 1243 is configured to transmit the message packet to a second client corresponding to the receiver user account, and decapsulate the message packet by using a second communication component embedded in the second client, to obtain the channel information and the message data. The channel information is used for indicating a source of the message data determined by the second client. The message data is displayed in a session interface created by the second communication component. The second client is a client of the first application platform.

The second transmitting subunit 1244 is configured to transmit the message packet to a third client corresponding to the receiver user account, and decapsulate the message packet by using the third client, to obtain the channel information and the message data. The channel information is used for indicating a source of the message data determined by the third client. The message data is displayed in a session interface corresponding to the third client. The third client is a client of the second application platform.

For specific implementations of the channel information determining subunit 1241, the message packet generation subunit 1242, the first transmitting subunit 1243, and the second transmitting subunit 1244, reference may be made to the description of transmitting the message data to the receiver user account in the foregoing embodiment corresponding to FIG. 3, and details are not described herein again.

For specific implementations of the authentication information obtaining unit 121, the user permission determining unit 122, the authentication unit 123, and the message transmitting unit 124, reference may be made to the description about operation S102 in the foregoing embodiment corresponding to FIG. 3, and details are not described herein again.

In some embodiments, the data processing apparatus 1 may further include: a second request obtaining module 13, a communication component encapsulation module 14, a communication component embedding module 15, a mapping relationship establishing module 16, a success prompt returning module 17, an abnormality prompt returning module 18, a third request obtaining module 19, and an association relationship establishing module 20.

The second request obtaining module 13 may be configured to obtain a component accessing request transmitted by the first client. The component accessing request includes registration information of the first client.

The communication component encapsulation module 14 may be configured to obtain an instant messaging function associated with the registration information from a function set corresponding to the second application platform based on the component accessing request, and encapsulate the obtained instant messaging function, to obtain the first communication component.

The communication component embedding module 15 may be configured to embed the first communication component into the first client.

The mapping relationship establishing module 16 may be configured to distribute a channel identifier and channel authorization information corresponding to the channel identifier to the first client based on the registration information, establish a mapping relationship between the registration information and the channel identifier, and store the mapping relationship into a mapping relationship table. The channel authorization information is used for verifying authenticity of the first client.

The success prompt returning module 17 may be configured to obtain, in a case that a transmitting status of the message data is a successful transmitting state, a first result code used for indicating the successful transmitting state, and return success prompt information corresponding to the first result code to the first client.

The abnormality prompt returning module 18 may be configured to obtain, in a case that the transmitting status of the message data is a failure transmitting state, a second result code used for indicating the failure transmitting state, and return abnormality prompt information corresponding to the second result code to the first client.

The third request obtaining module 19 may be configured to obtain a user adding request transmitted by the first client through the first communication component, and transmit the user adding request to the receiver user account.

The association relationship establishing module 20 may be configured to establish a user association relationship between the receiver user account and the transmitter user account in a case that the second client to which the receiver user account belongs responds to the user adding request.

For specific implementations of the first request obtaining module 11, the message transmitting module 12, the second request obtaining module 13, the communication component encapsulation module 14, the communication component embedding module 15, the mapping relationship establishing module 16, the success prompt returning module 17, the abnormality prompt returning module 18, the third request obtaining module 19, and the association relationship establishing module 20, reference may be made to the description about operation S201 to operation S206 in the foregoing embodiment corresponding to FIG. 7, and details are not described herein again. In addition, beneficial effects achieved by using the same method are not described herein again.

Figure 9:
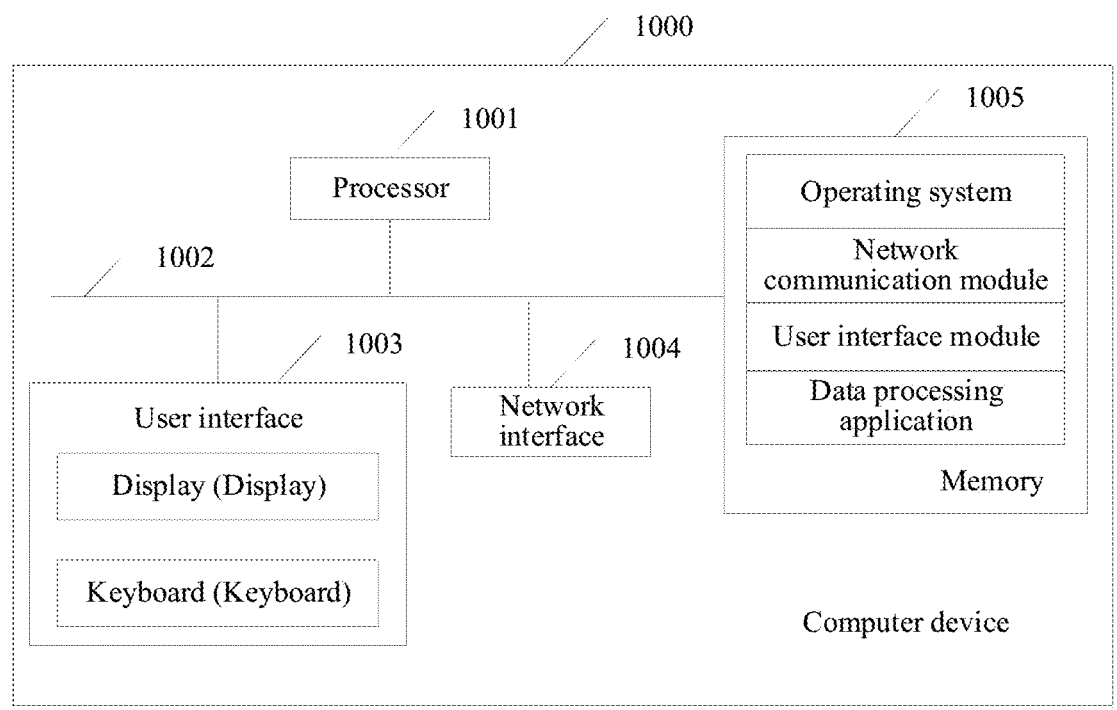
FIG. 9 is a schematic diagram of a computer device according to some embodiments.

FIG. 9 is a schematic structural diagram of a computer device 1000 according to some embodiments. As shown in FIG. 9, the computer device 1000 may be the server 20 in the foregoing embodiment corresponding to FIG. 2. The computer device 1000 may include at least one processor 1001 such as a CPU, at least one network interface 1004, a user interface 1003, a memory 1005, and at least one communication bus 1002. The communication bus 1002 is configured to implement connection and communication between these components. The user interface 1003 may include a display, a keyboard, and optionally, the network interface 1004 may include a standard wired interface and a standard wireless interface (for example, a WI-FI interface). The memory 1005 may be a high-speed random access memory (RAM), or may be a non-volatile memory, for example, at least one magnetic disk storage. Further, the memory 1005 may be at least one storage apparatus located remotely from the foregoing processor 1001. As shown in FIG. 9, the memory 1005, as a computer storage medium, may include an operating system, a network communication module, a user interface module, and a data processing application.

In the computer device 1000 shown in FIG. 9, the network interface 1004 is mainly configured to perform network communication with a first user terminal in which a first client runs and a second user terminal in which a second client runs. The user interface 1003 is mainly configured to provide an input interface for a user. The processor 1001 may be configured to invoke a data processing application stored in the memory 1005, to implement:

obtaining a message transmitting request including message data transmitted by a first communication component, the first communication component being embedded in a first client of a first application platform, the first communication component being obtained by encapsulating an instant messaging function of a second application platform, the second application platform being different from the first application platform, in response to a trigger operation on a session creation control in a service interface of the first client, the first client invoking the first communication component and displaying a session interface created by the first communication component, and obtaining the message data in the session interface, generating the message transmitting request including the message data, and transmitting the message transmitting request to the server by using the first communication component, the session interface being an interface on which a transmitter user account corresponding to the first client performs instant communication with a receiver user account, and the transmitter user account being a user account corresponding to the second application platform and logging in to the first client in a third-party account login manner; and transmitting the message data to the receiver user account according to the message transmitting request.

The computer device 1000 described in embodiments can implement the descriptions of the data processing method based on instant messaging in the foregoing embodiments corresponding to FIG. 3 to FIG. 7, and can also implement the descriptions of the data processing apparatus 1 based on instant messaging in the foregoing embodiment corresponding to FIG. 8. Details are not described herein again. In addition, beneficial effects achieved by using the same method are not described herein again.

In addition, some embodiments further provide a non-transitory computer-readable storage medium. The computer-readable storage medium stores a computer program executed by the data processing apparatus 1 based on instant messaging mentioned above, and the computer program includes program instructions, formed by program modules, units, or code. When executing the program instructions, the processor can implement the descriptions of the data processing method based on instant messaging in the foregoing embodiment corresponding to FIG. 3 or FIG. 7. Therefore, details are not described herein again. In addition, beneficial effects achieved by using the same method are not described herein again. For technical details that are not disclosed in the embodiments of the computer-readable storage medium, refer to the method embodiments. In an example, the program instruction may be deployed to be executed on a computing device, or deployed to be executed on a plurality of computing devices at the same location, or deployed to be executed on a plurality of computing devices that are distributed in a plurality of locations and interconnected through a communication network. The plurality of computing devices that are distributed in the plurality of locations and interconnected through the communication network may form a blockchain system.

An example embodiment further provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the data processing method based on instant messaging in the foregoing embodiment corresponding to FIG. 3 or FIG. 7. Details are not described herein again. In addition, beneficial effects achieved by using the same method are not described herein again.

Figure 10:
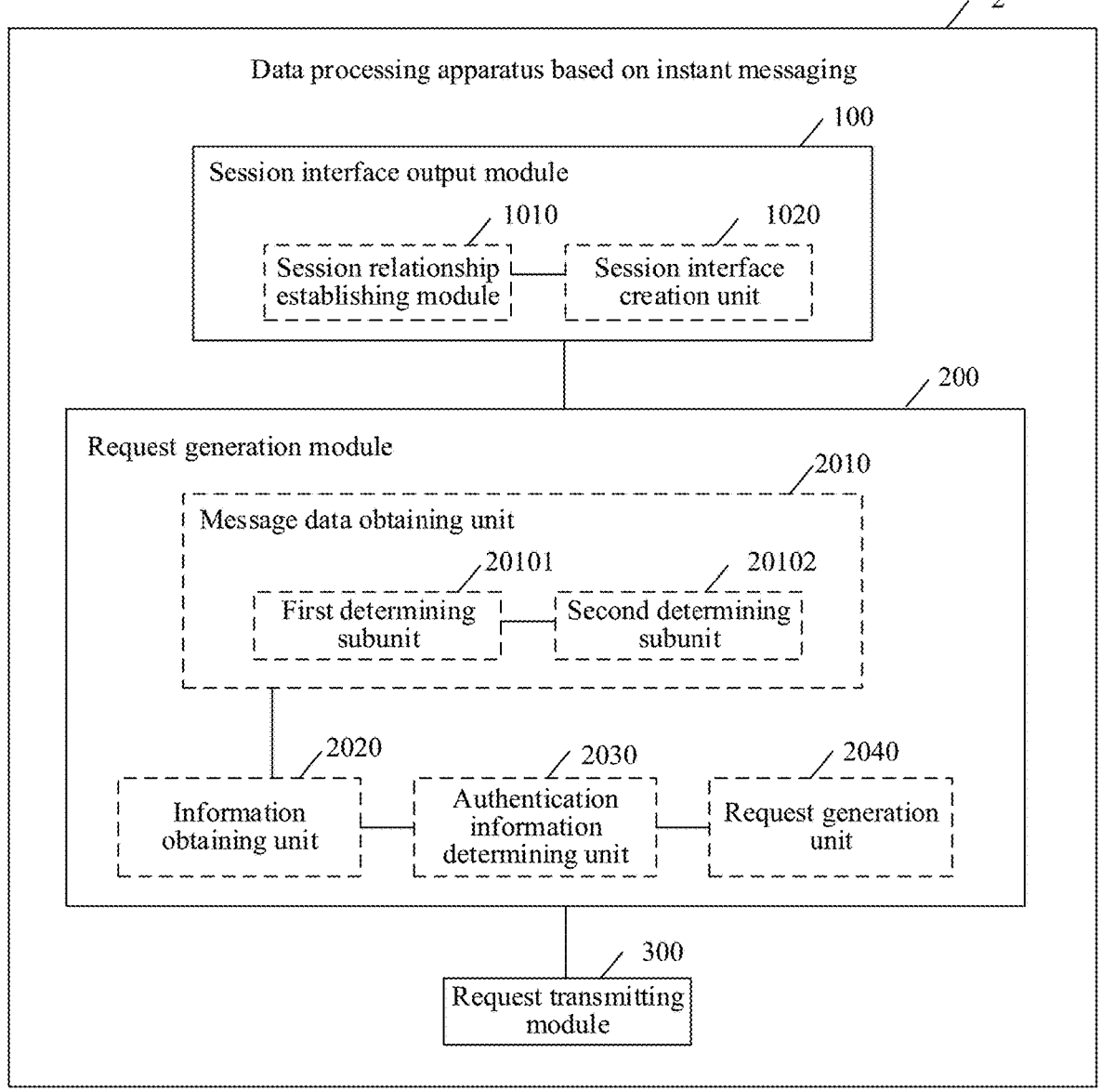
FIG. 10 is a schematic structural diagram of a data processing apparatus based on instant messaging according to some embodiments.

FIG. 10 is a schematic structural diagram of a data processing apparatus 2 based on instant messaging according to some embodiments. The data processing apparatus 2 based on instant messaging may be a computer program (including program code) run on a computer device. For example, the data processing apparatus 2 based on instant messaging is application software. The data processing apparatus 2 based on instant messaging may be configured to perform the corresponding operations in the method provided in the embodiments of the disclosure. As shown in FIG. 10, the data processing apparatus 2 based on instant messaging may run in a first client. The data processing apparatus 2 based on instant messaging may include a session interface output module 100, a request generation module 200, and a request transmitting module 300.

The session interface output module 100 is configured to invoke, in response to a trigger operation on a session creation control in a service interface of the first client, a first communication component corresponding to the session creation control, and output a session interface created by the first communication component. The service interface is an interface in the first application platform. The first communication component is obtained by encapsulating an instant messaging function of a second application platform by a server of the second application platform. The second application platform is different from the first application platform. The session interface is an interface on which a transmitter user account corresponding to the first client performs instant communication with a receiver user account. The transmitter user account is a user account corresponding to the second application platform and logging in to the first client in a third-party account login manner.

The request generation module 200 is configured to obtain to-be-transmitted message data in the session interface, and generate a message transmitting request including the message data.

The request transmitting module 300 is configured to transmit the message transmitting request to the server by using the first communication component. The message transmitting request is used for instructing the server to transmit the message data to a second client corresponding to the receiver user account.

The session interface output module 100 may include: a session relationship establishing unit 1010 and a session interface creating unit 1020.

The session relationship establishing unit 1010 may be configured to invoke, in response to the trigger operation on the session creation control in the service interface, the first communication component corresponding to the session creation control, and establish a session relationship between the receiver user account and the transmitter user account in the service interface. The transmitter user account is a user account corresponding to the first client.

The session interface creation unit 1020 may be configured to establish, based on the session relationship, the session interface on which the transmitter user account performs instant communication with the receiver user account, and output the session interface.

For specific implementations of the session relationship establishing unit 1010 and the session interface creation unit 1020, reference may be made to the description of creating the session interface in the foregoing embodiment corresponding to FIG. 3, and details are not described herein again.

The request generation module 200 may include: a message data obtaining unit 2010, an information obtaining unit 2020, an authentication information determining unit 2030, and a request generation unit 2040.

The message data obtaining unit 2010 may be configured to obtain to-be-transmitted message data in the session interface.

The message data obtaining unit 2010 may include: a first determining subunit 20101 or a second determining subunit 20102.

The first determining subunit 20101 may be configured to obtain service data information in a service interface and determine the service data information as the to-be-transmitted message data; or the second determining subunit 20102 may be configured to determine message data in a message input region in the session interface as the to-be-transmitted message data in response to a trigger operation on a service transmitting control in the session interface.

For a specific implementation of the first determining subunit 20101 or the second determining subunit 20102, reference may be made to the description of obtaining the message data in the foregoing embodiment corresponding to FIG. 3. Details are not described herein again.

The information obtaining unit 2020 may be configured to obtain a channel identifier and channel authorization information corresponding to the channel identifier, and obtain the receiver user account in the service interface. The channel identifier is an identifier distributed by the server corresponding to the first communication component in a case that the first client obtains the first communication component. The channel authorization information is used for determining authenticity of the first client.

The authorization information determining unit 2030 may be configured to determine service authentication auxiliary information corresponding to the message data based on the obtained channel identifier, the obtained channel authorization information, and the receiver user account.

The request generation unit 2040 may be configured to generate the message transmitting request based on the service authentication auxiliary information and the message data, so that the server transmits the message data to the receiver user account based on the message transmitting request.

For specific implementations of the message data obtaining unit 2010, the information obtaining unit 2020, the authentication information determining unit 2030, and the request generation unit 2040, reference may be made to the description of transmitting the message data in the foregoing embodiment corresponding to FIG. 3, and details are not described herein again.

For specific implementations of the session interface output module 100, the request generation module 200, and the request transmitting module 300, reference may be made to the description of operation S201 to operation S206 in the foregoing embodiment corresponding to FIG. 7. Details are not described herein again. In addition, beneficial effects achieved by using the same method are not described herein again.

Figure 11:
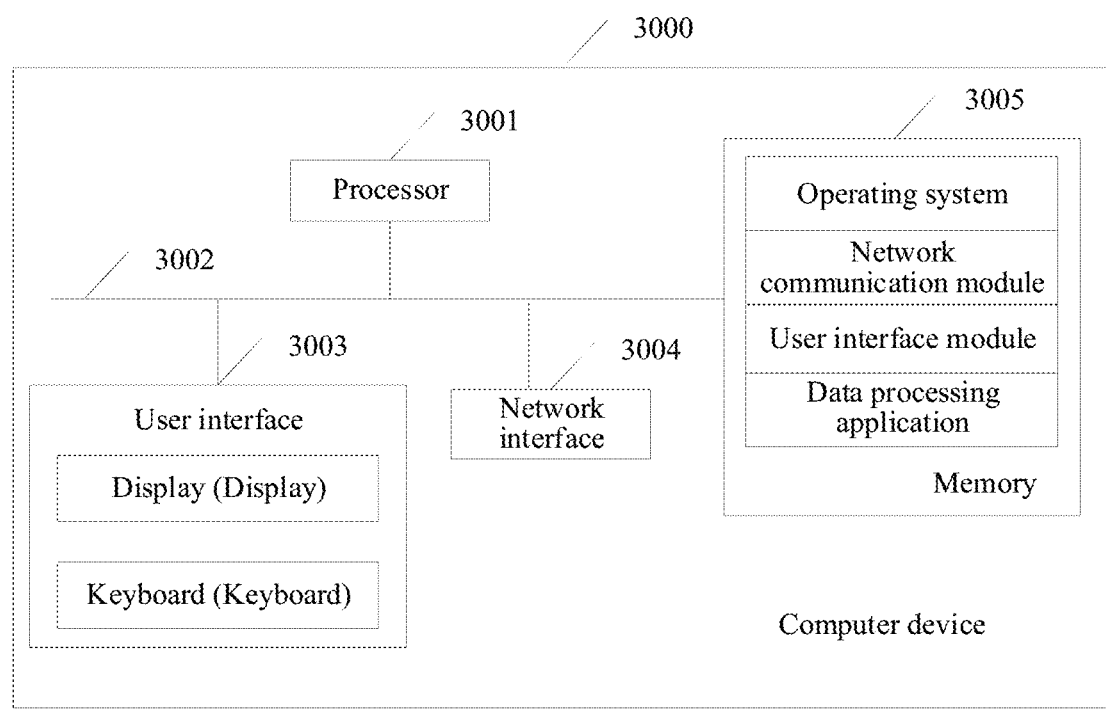
FIG. 11 is a schematic diagram of a computer device according to some embodiments.

FIG. 11 is a schematic structural diagram of a computer device 3000 according to some embodiments. As shown in FIG. 11, the computer device 3000 may be the first client. The computer device 3000 may include at least one processor 3001 such as a CPU, at least one network interface 3004, a user interface 3003, a memory 3005, and at least one communication bus 3002. The communication bus 3002 is configured to implement connection and communication between these components. The user interface 3003 may include a display, a keyboard, and optionally, the network interface 3004 may include a standard wired interface and a standard wireless interface (for example, a WI-FI interface). The memory 3005 may be a high-speed RAM memory, or may be a non-volatile memory, for example, at least one magnetic disk memory. The memory 3005 may be at least one storage apparatus located remotely from the foregoing processor 3001. As shown in FIG. 11, the memory 3005, as a computer storage medium, may include an operating system, a network communication module, a user interface module, and a data processing application.

In the computer device 3000 shown in FIG. 11, the network interface 3004 is mainly configured to perform network communication with the computer device (for example, the server 20 shown in FIG. 2) having an instant messaging function. The user interface 3003 is mainly configured to provide an input interface for a user. The processor 3001 may be configured to invoke a data processing application stored in the memory 3005, to implement:

invoking, in response to a trigger operation on a session creation control in a service interface of the first client, a first communication component corresponding to the session creation control, and outputting a session interface created by the first communication component, the service interface being an interface in the first application platform, the first communication component being obtained by encapsulating an instant messaging function of a second application platform by a server of the second application platform, the second application platform being different from the first application platform, the session interface being an interface on which a transmitter user account corresponding to the first client performs instant communication with a receiver user account, and the transmitter user account being a user account corresponding to the second application platform and logging in to the first client in a third-party account login manner;

obtaining to-be-transmitted message data in the session interface, and generating a message transmitting request including the message data; and transmitting the message transmitting request to the server by using the first communication component, the message transmitting request being used for instructing the server to transmit the message data to a second client corresponding to the receiver user account.

The computer device 3000 described in some embodiments can implement the descriptions of the data processing method based on instant messaging in the foregoing embodiment corresponding to FIG. 7, and can also implement the descriptions of the data processing apparatus 2 based on instant messaging in the foregoing embodiment corresponding to FIG. 10. Details are not described herein again. In addition, beneficial effects achieved by using the same method are not described herein again.

In addition, some embodiments further provide a non-volatile computer-readable storage medium. The computer-readable storage medium stores a computer program executed by the data processing apparatus 2 based on instant messaging mentioned above, and the computer program includes program instructions, formed by program modules, units, or code. When executing the program instructions, the processor can implement the descriptions of the data processing method based on instant messaging in the foregoing embodiment corresponding to FIG. 7. Therefore, details are not described herein again. In addition, beneficial effects achieved by using the same method are not described herein again. For technical details that are not disclosed in the embodiments of the computer-readable storage medium, refer to the method embodiments. In an example, the program instruction may be deployed to be executed on a computing device, or deployed to be executed on a plurality of computing devices at the same location, or deployed to be executed on a plurality of computing devices that are distributed in a plurality of locations and interconnected through a communication network. The plurality of computing devices that are distributed in the plurality of locations and interconnected through the communication network may form a blockchain system.

An example embodiment provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the data processing method based on instant messaging in the foregoing embodiment corresponding to FIG. 3 or FIG. 7. Details are not described herein again. In addition, beneficial effects achieved by using the same method are not described herein again.

Figure 12:
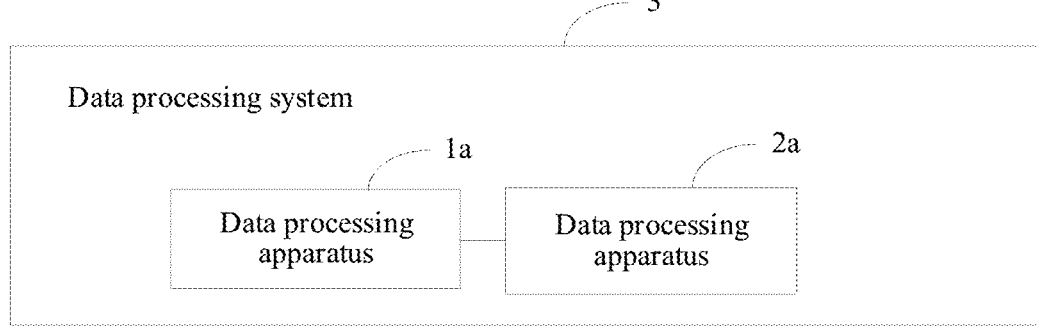
FIG. 12 is a schematic structural diagram of a data processing system according to some embodiments.

FIG. 12 is a schematic structural diagram of a data processing system 3 according to some embodiments. The data processing system 3 may include a data processing apparatus 1a and a data processing apparatus 2a. The data processing apparatus 1a may be the data processing apparatus 1 based on instant messaging in the foregoing embodiment corresponding to FIG. 8. The data processing apparatus 1a may be integrated into the server 20 in the foregoing embodiment shown in FIG. 2. Therefore, details are not described herein again. The data processing apparatus 2a may be the data processing apparatus 2 based on instant messaging in the foregoing embodiment corresponding to FIG. 10. The data processing apparatus 2a may be integrated into the first client running in the first user terminal in the corresponding embodiment. Therefore, details are not described herein again. In addition, beneficial effects achieved by using the same method are not described herein again. For technical details that are not disclosed in the embodiment of the data processing system of the disclosure, refer to the descriptions of the method embodiments.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

The data processing method and apparatus, the terminal, and the computer-readable storage medium provided in the embodiments of the disclosure are described above in detail. Although the principles and implementations of the disclosure are described by using specific examples in the specification, the foregoing descriptions of the embodiments are only intended to help understand the method and core idea of the disclosure. In addition, a person skilled in the art can make variations in terms of the specific implementations and application scopes according to the ideas of the disclosure. Therefore, the content of this specification shall not be construed as a limitation to the disclosure.

What is claimed is:

1. A data processing method based on instant messaging, performed by a computer device of a second application platform, the method comprising:
   obtaining a component accessing request transmitted by a first client, the component accessing request comprising registration information of the first client;
   obtaining, based on the component accessing request, an instant messaging function associated with the registration information from a function set corresponding to the second application platform and encapsulating the obtained instant messaging function to obtain a first communication component;
   embedding the first communication component into the first client;
   obtaining a message transmitting request transmitted by a first communication component embedded in a first client of a first application platform, the transmitting request comprising message data and the second application platform being different from the first application platform; and
   transmitting the message data to a receiver user account according to the message transmitting request,
   wherein the data processing method further comprises:
   distributing a channel identifier and channel authorization information corresponding to the channel identifier to the first client based on the registration information,
   establishing a mapping relationship between the registration information and the channel identifier, and
   storing the mapping relationship into a mapping relationship table, the channel identifier being an identifier distributed by the server in a case that the first client obtains the first communication component, and the channel authorization information being used for verifying authenticity of the first client.

2. The data processing method according to claim 1, wherein the message transmitting request comprises service authentication auxiliary information corresponding to the message data; and
   the transmitting comprises:
   obtaining the service authentication auxiliary information in the message transmitting request, the service authentication auxiliary information comprising the receiver user account and the transmitter user account;
   determining a user permission corresponding to the receiver user account, the user permission being used for indicating a permission to transmit and receive the message data between the receiver user account and the transmitter user account;
   performing authentication on the message transmitting request based on the service authentication auxiliary information in a case that the user permission is a message transmittable and receivable permission; and
   transmitting the message data to the receiver user account in a case that the authentication on the message transmitting request succeeds.

3. The data processing method according to claim 2, wherein
   the performing comprises:
   obtaining a to-be-matched channel identifier and to-be-matched channel authorization information in the service authentication auxiliary information in a case that the user permission is the message transmittable and receivable permission;
   querying the to-be-matched channel identifier based on the mapping relationship table, and using, in a case that a channel identifier the same as the to-be-matched channel identifier is queried from the mapping relationship table, the channel identifier the same as the to-be-matched channel identifier as a target channel identifier;

obtaining target channel authorization information corresponding to the target channel identifier, obtaining target registration information corresponding to the target channel identifier from the mapping relationship table in a case that the to-be-matched channel authorization information is the same as the target channel authorization information, and matching the service authentication auxiliary information and the target registration information to obtain a matching result;

determining that the authentication on the message transmitting request succeeds in a case that the matching result indicates that the matching between the service authentication auxiliary information and the target registration information succeeds; and determining that the authentication on the message transmitting request fails in a case that the matching result indicates that the matching between the service authentication auxiliary information and the target registration information fails.

4. The data processing method according to claim 3, wherein the transmitting the message data to the receiver user account in a case that the authentication on the message transmitting request succeeds comprises:

using, in a case that the authentication on the message transmitting request succeeds, the target registration information corresponding to the target channel identifier queried from the mapping relationship table as channel information;

generating a message packet according to the channel information and the message data; and transmitting the message packet to a second client corresponding to the receiver user account, and decapsulating the message packet by using a second communication component embedded in the second client to obtain the channel information and the message data, the channel information being used for indicating a source of the message data determined by the second client, the second client displaying the message data in a session interface created by the second communication component, and the second client being a client of the first application platform.

5. The data processing method according to claim 4, further comprising:

transmitting the message packet to a third client corresponding to the receiver user account, and decapsulating, by the third client, the message packet, to obtain the channel information and the message data, the channel information being used for indicating a source of the message data determined by the third client; and displaying the message data in a session interface corresponding to the third client, the third client being a client of the second application platform.

6. The data processing method according to claim 1, further comprising:

obtaining, in a case that a transmitting status of the message data is a successful transmitting state, a first result code used for indicating the successful transmitting state, and returning success prompt information corresponding to the first result code to the first client; and obtaining, in a case that the transmitting status of the message data is a failure transmitting state, a second result code used for indicating the failure transmitting state, and returning abnormality prompt information corresponding to the second result code to the first client.

7. The data processing method according to claim 1, further comprising:

obtaining a user adding request transmitted by the first client through the first communication component, and transmitting the user adding request to the receiver user account; and establishing a user association relationship between the receiver user account and the transmitter user account corresponding to the first client in a case that the second client to which the receiver user account belongs responds to the user adding request.

\* \* \* \* \*